US011973270B2

(12) United States Patent
Schultz et al.

(10) Patent No.: US 11,973,270 B2
(45) Date of Patent: Apr. 30, 2024

(54) FLAT LENS ANTENNA

(71) Applicant: Compass Technology Group, LLC, Alpharetta, GA (US)

(72) Inventors: John W. Schultz, Alpharetta, GA (US); Brian L Petrie, Cumming, GA (US); Crystal L Bethards, Cumming, GA (US); James G. Maloney, Marietta, GA (US)

(73) Assignee: COMPASS TECHNOLOGY GROUP LLC, Alpharetta, GA (US)

( * ) Notice: Subject to any disclaimer, the term of this patent is extended or adjusted under 35 U.S.C. 154(b) by 0 days.

(21) Appl. No.: 17/635,206

(22) PCT Filed: Aug. 14, 2020

(86) PCT No.: PCT/US2020/046528

§ 371 (c)(1),
(2) Date: Feb. 14, 2022

(87) PCT Pub. No.: WO2021/030758

PCT Pub. Date: Feb. 18, 2021

(65) Prior Publication Data

US 2022/0278459 A1 Sep. 1, 2022

Related U.S. Application Data

(60) Provisional application No. 62/886,617, filed on Aug. 14, 2019.

(51) Int. Cl.

*H01Q 19/08* (2006.01)
*H01Q 1/38* (2006.01)

(Continued)

(52) U.S. Cl.

CPC ............... *H01Q 19/08* (2013.01); *H01Q 1/38* (2013.01); *H01Q 1/525* (2013.01); *H01Q 13/02* (2013.01); *H01Q 13/085* (2013.01); *H01Q 15/04* (2013.01)

(58) Field of Classification Search

CPC ........ H01Q 13/085; H01Q 1/38; H01Q 1/525; H01Q 13/02; H01Q 15/04; H01Q 19/08;

(Continued)

(56) References Cited

U.S. PATENT DOCUMENTS 4,853,704 A * 8/1989 Diaz .................... H01Q 13/085 343/770
6,317,094 B1 * 11/2001 Wu .................... H01Q 21/0087 343/770

(Continued)

FOREIGN PATENT DOCUMENTS

EP 1425822 6/2004
EP 3182515 A1 * 6/2017

(Continued)

OTHER PUBLICATIONS

International Search Report for PCT/US20/46528 dated Nov. 4, 2020.

(Continued)

*Primary Examiner* — Vibol Tan

(74) *Attorney, Agent, or Firm* — Thomas | Horstemeyer, LLP

(57) ABSTRACT

Various examples are provided for flat lens antennas and their operation. In one example, among others, an antenna includes electrically thin (W<<λhigh), highly conducting, TEM mode antenna arms fed at a first end by a balun. The TEM mode antenna arms can be embedded in a spatially varied anisotropic dielectric material. A separation between the TEM mode antenna arms can increase from the first end (Continued)

to a second end where the TEM mode antenna arms transition to resistive card (Rcard) terminations when the TEM mode antenna arms are separated by a distance Hr, where a ratio of Hr to a height (H) of the antenna is in a range from about 0.2 to about 0.8.

26 Claims, 38 Drawing Sheets

(51) Int. Cl.

| | |
|---|---|
| ***H01Q 1/52*** | (2006.01) |
| ***H01Q 13/02*** | (2006.01) |
| ***H01Q 13/08*** | (2006.01) |
| ***H01Q 15/04*** | (2006.01) |

(58) Field of Classification Search
CPC ............. H01Q 21/0087; H01Q 21/064; H01Q 9/0457; H01Q 15/10; H01Q 19/065
See application file for complete search history.

(56) References Cited

U.S. PATENT DOCUMENTS

| | | | | |
|---|---|---|---|---|
| 6,437,748 | B1 | 8/2002 | Burnside et al. | |
| 6,867,742 | B1 | 3/2005 | Irion, II et al. | |
| 7,786,944 | B2 * | 8/2010 | Franson | H01Q 1/38 343/770 |
| 8,451,189 | B1 | 5/2013 | Fluhler | |
| 10,230,170 | B1 * | 3/2019 | Boulais | H01Q 13/02 |

FOREIGN PATENT DOCUMENTS

| | | | | | |
|---|---|---|---|---|---|
| GB | 2508428 | A | * | 6/2014 | H01Q 13/085 |
| RU | 2686876 | C | | 5/2019 | |
| WO | WO-0048265 | A1 | * | 8/2000 | H01P 5/107 |

OTHER PUBLICATIONS

European Search Report for EP 20852078.3 mailed Jul. 3, 2023.
Li-Chung T., et al., An Ultrawide-Bandwidth Tapered Resistive TEM Horn Antenna, IEEE Transactions on Antennas and Progagation, vol. 48, No. 12, Dec. 2000.
Turk, et al., "Investigation of Convenient Antenna Designs for Ultra-Wide Band GPR Systems", 2007 4th International Workshop On, IEEE, PI, Jun. 1, 2007.

* cited by examiner

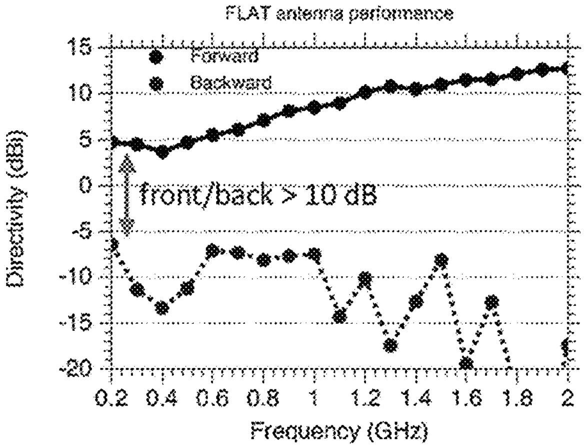
FIG. 9A
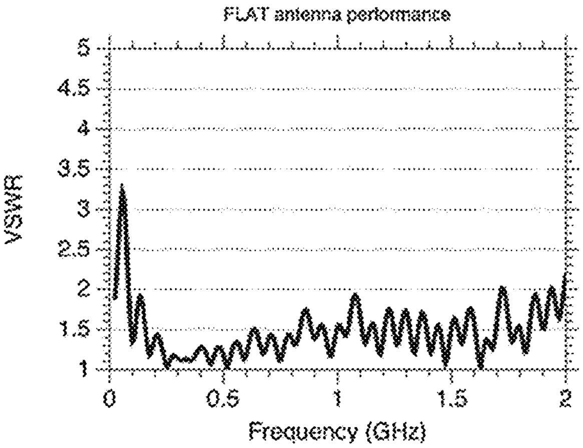
FIG. 9B
| | FLAT Initial Embodiment | COTS Horn Antenna (MVG SH-200) |
|---|---|---|
| Length | 42" | 42" |
| Width | 2" | 34" |
| Height | 16" | 23" |
| Weight | < 25 lb. | 55 lb. |
| Frequency | 0.2 – 2 GHz | 0.2 – 3 GHz |
| Directivity | 5-13 dBi | 6-15 dBi |
FIG. 10

| Vendor | Bandwidth | Z Ratio | Technology |
|---|---|---|---|
| Marki | 500 KHz – 3 GHz | 1:1 | Surface Mount |
| Macom | 4.5 MHz – 3 GHz | 1:1 | Ferrite Core |
| Macom | 30 MHz – 2.5 GHz | 1:4 | Ferrite Core |
| CoilCraft | 0.1 MHz – 3.5 GHz | 1:1 | Ferrite Core |

| Material Name | Stick Information | Cube Picture | E Field Perpendicular Permittivity | E Field Parallel Permittivity | E Field Parallel Loss | E Field Perpendicular Loss |
|---|---|---|---|---|---|---|
| 3DX Tech Carbon Fiber | 3 Sticks<br>Tall Height |  | 1.2 | 2.8 | 0 | 0 |

FLAT LENS ANTENNA

CROSS REFERENCE TO RELATED APPLICATIONS

This application is the 35 U.S.C. 0.371 national stage application of PCT Application No. PCT/US2020/046528, filed Aug. 14, 2020, which claims priority to, and the benefit of, U.S. provisional application entitled "Flat Lens Antenna" having Ser. No. 62/886,617, filed Aug. 14, 2019, both of which are hereby incorporated by reference herein in their entireties.

BACKGROUND

Existing, directive antennas that support UHF & VHF band (e.g. 0.2-3.0 GHz) operations, are typically large and heavy. Usage cases typically require UHF/VHF antennas to be mountable on stands, rails, or robotic arms without excessive mechanical reinforcement. This large weight and size limit the usefulness of these existing antennas.

SUMMARY

Aspects of the present disclosure are related to flat lens antennas and their operation. In one aspect, among others, an antenna comprises electrically thin ($W \ll \lambda_{high}$), highly conducting, TEM mode antenna arms fed at a first end by a balun. The TEM mode antenna arms can be embedded in a spatially varied anisotropic dielectric material, and a separation between the TEM mode antenna arms can increase from the first end to a second end where the TEM mode antenna arms transition to resistive card (Rcard) terminations when the TEM mode antenna arms are separated by a distance Hr, where a ratio of Hr to a height (H) of the antenna is in a range from about 0.2 to about 0.8.

In one or more aspects, the balun can be a chip balun, a geometric balun, or an infinite balun. The spatially varied anisotropic dielectric material can comprise an antenna throat region, an antenna transition region, an antenna lens region, an antenna back region and a balun region. The balun region can comprise a printed circuit board. The antenna throat region can comprise a machine unfilled polymer. The spatially varied anisotropic dielectric material inside the TEM mode antenna arms can form an elliptical lens profile, a parabolic lens profile, a hyperbolic lens profile or a graded dielectric lens.

In various aspects, the TEM mode antenna arms can be terminated in a resistive card. A loss of the antenna back material can be realized with a single resistive card. The spatially varied anisotropic dielectric material can be formed using a lattice of conducting sticks in a low-density foam host. The lattice of conducting sticks in a low-density foam host can be manufactured by milling one side of foam crackers and 3D printing a carbon fiber filament on the other side. The crackers can be coupled together by a snap fit connection. The ratio of Hr/H can be in a range from about 0.4 to about 0.6.

In some aspects, the spatially varied anisotropic dielectric material inside the TEM mode antenna arms can be concentrated near an axis of the antenna and a remaining width is formed of low dielectric material. A separation between the TEM mode antenna arms can follow an exponential function. An impedance of the TEM mode antenna arms can follow an exponential function. The TEM mode antenna arms can comprise a transition at an end, wherein the transition exponentially varies to flat at the end. The TEM mode antenna arms can terminate into a resistive sheet at an end of the TEM mode antenna arms. The resistive sheet can be curved to reduce end reflection. The spatially varied anisotropic dielectric material outside the TEM mode antenna arms can comprise a lattice of lossy dielectric sticks. The spatially varied anisotropic dielectric material outside the TEM mode antenna arms can comprise an on-axis resistive card. An end of the TEM mode antenna arms can be tangent matched to a balun at the end of the TEM mode antenna arms. The spatially varied anisotropic dielectric material inside the TEM mode antenna can comprise a lattice of conductive sticks of different sizes and shapes etched on thin printed circuit boards separated with foam sheets.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 9A and 9B illustrate examples of calculated performance of the flat lens antenna of FIG. 8, in accordance with various embodiments of the present disclosure.

FIG. 10 is a table illustrating a comparison of size, weight and performance between flat lens antenna of FIG. 8 and a commercial of the shelf (COTS) horn antenna, in accordance with various embodiments of the present disclosure.

DETAILED DESCRIPTION

Figure 1:
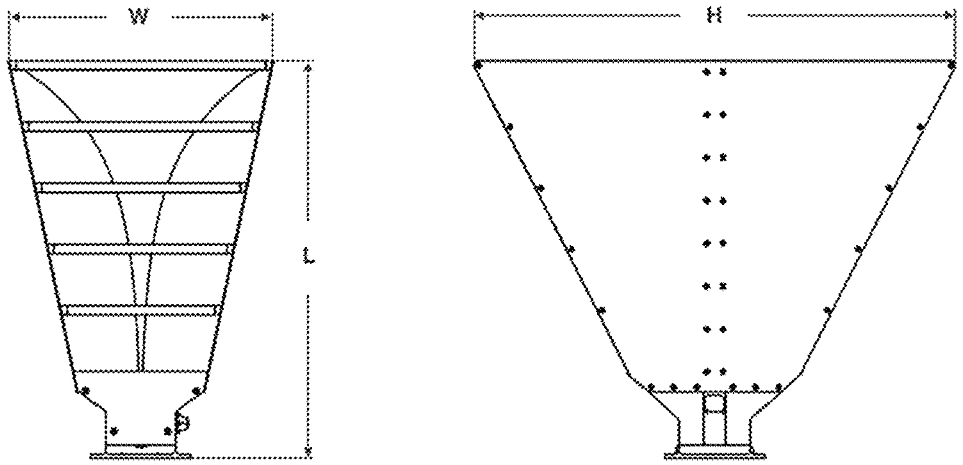
FIG. 1 illustrates an example of a UHF/VHF antenna, in accordance with various embodiments of the present disclosure.

Disclosed herein are various examples related to flat lens antennas and their operation. Reference will now be made in detail to the description of the embodiments as illustrated in the drawings, wherein like reference numbers indicate like parts throughout the several views.

An example of the dimensions of a commercially available metal antenna are illustrated in FIG. 1. A MVG model SH-200 antenna has a size of 42"×34"×23" (H, L, W), and a weight of 55 pounds with a directivity that varies from 6-15 dB across the band 0.2-3.0 GHz band. The large size of these antennas restrict use in several applications. For example, for transportable systems, these existing antennas require a large rectilinear shipping crate with a volume of 0.5-1.0 cubic meters depending on the amount of protective packaging.

Figure 2:
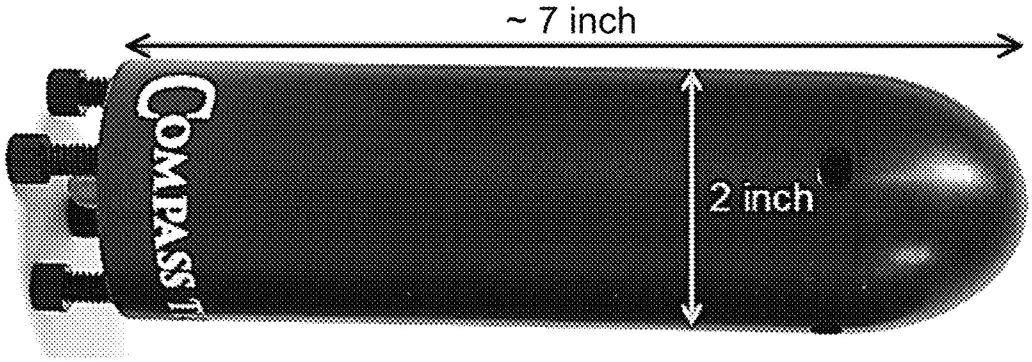
FIG. 2 illustrates an example of a spot probe antenna, in accordance with various embodiments of the present disclosure.

FIG. 2 shows an example of a broadband, RF spot probe antenna (Compass Technology Group (CTG) SP218 RF design). The antenna provides a directive gain from 2-18 GHz. The spot probe antenna comprises shaped metal antenna arms embedded in a low-loss dielectric material. The size of the antenna is 2-inches in diameter, about 7 inches in length as illustrated. The outer shape of this antenna at the radiation end incorporates an elliptical lens to focus the radiation at a distance of 1 inch to 3 inches in front of the antenna. The size and weight of this RF Spot probe antenna can enable a wide diversity of successful usage on fixed stands and robotic arms.

Fundamental physics dictates that a directive antenna's size scales with wavelength (or, equivalently, inversely to frequency). This limitation is due to the fact that an antenna transitions electromagnetic energy into free-space radiation, where the radiated wave cannot be shrunk with high-index material or circuit analog structures. For a UHF/VHF antenna, simple frequency scaling dictates that the antenna be roughly 10 times larger than a similar 2-18 GHz microwave antenna to have equivalent directivity and bandwidth. Simply scaling the CTG 218 design would yield an antenna 20 inch in diameter, 70 inch in length, weighing hundreds of pounds.

Unfortunately, the recent miniaturization trend in RF circuitry does not benefit advanced antenna design since the free-space wavelength is still the primary driver in determining the ability of an antenna to radiate in a preferential direction. This is why decades of attempting to miniaturize UHF/VHF sensors across the RF antenna community have shown only limited successes.

Because existing UHF/VHF directive antennas are large and heavy, and because directly scaling, higher frequency antennas (e.g. 2-18 GHz) also results in large and heavy antennas, a new class of antennas called FLAT has been developed.

Figure 3:
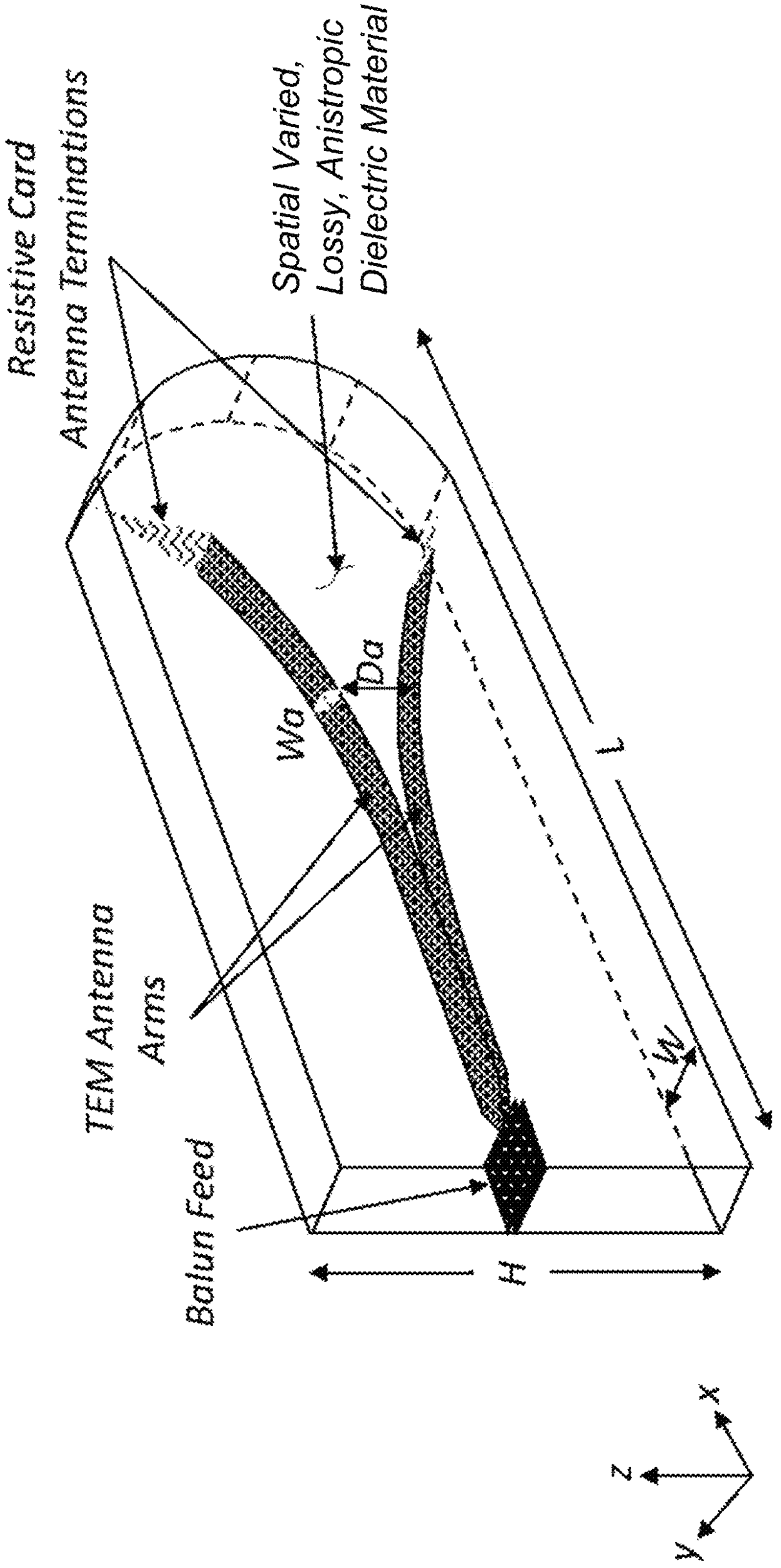
FIGS. 3 and 4 are perspective and side views illustrating an example of a flat lens antenna, in accordance with various embodiments of the present disclosure.

Rather than trying to reduce the antenna thickness in the propagation direction, the FLAT innovation instead shrinks the antenna perpendicular to the propagation direction. FIG. 3 illustrates an example of the flat lens antenna. Maintaining a reasonable length, L, parallel to direction of radiation allows the flat lens antenna to provide sufficient directivity needed for use cases.

Figure 4:
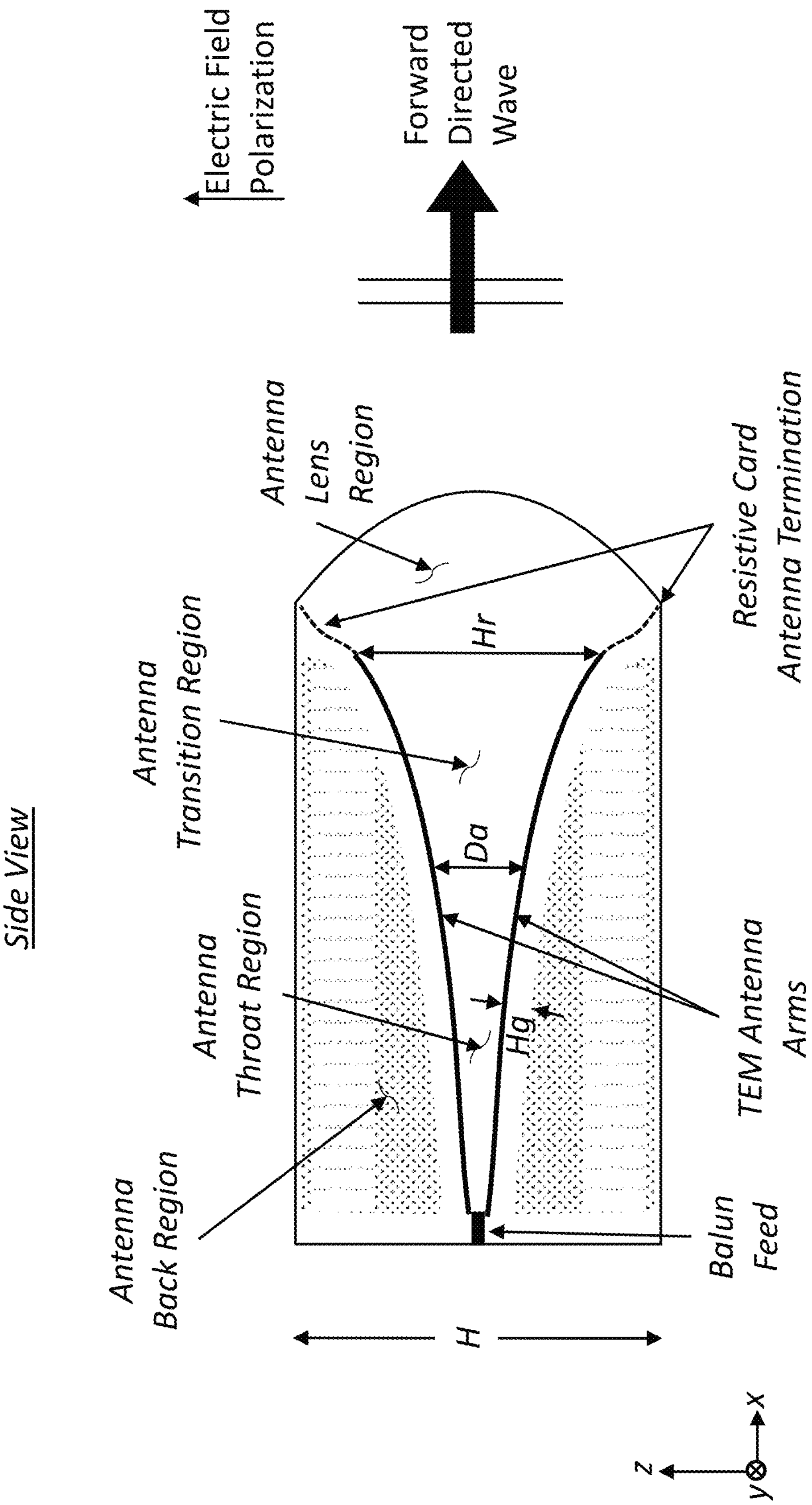

In the example of FIGS. 3 and 4, a flat lens antenna comprises:

electrically thin ($W \ll \lambda_{high}$), highly conducting, TEM mode antenna arms, which transition into resistive cards when the separation is Hr, fed by a balun, and are embedded in a spatially varied, anisotropic dielectric material.

The flat lens antenna radiates a forward directive wave with an electric field (polarization) in the plane of the antenna as shown in FIG. 4.

The side view of the flat lens antenna shown in FIG. 4 identifies four major anisotropic dielectric material regions: the "Antenna Throat", the "Antenna Transition", the "Antenna Lens", and the "Antenna Back". A balun region is also included.

Because the desired radiated electric field is in the plane of the antenna, it is advantageous to only use anisotropic materials that effect the in-plane polarization (2 in FIGS. 3 and 4). In fact, it can be disadvantageous in some of these four regions to have large dielectric constants in the other two tensor directions. Thus, custom anisotropic dielectric meta-materials are designed into the flat antenna structure.

The term meta-material is used here to denote man-made, artificial dielectrics realized by combining other materials in clever patterning.

Figure 5:
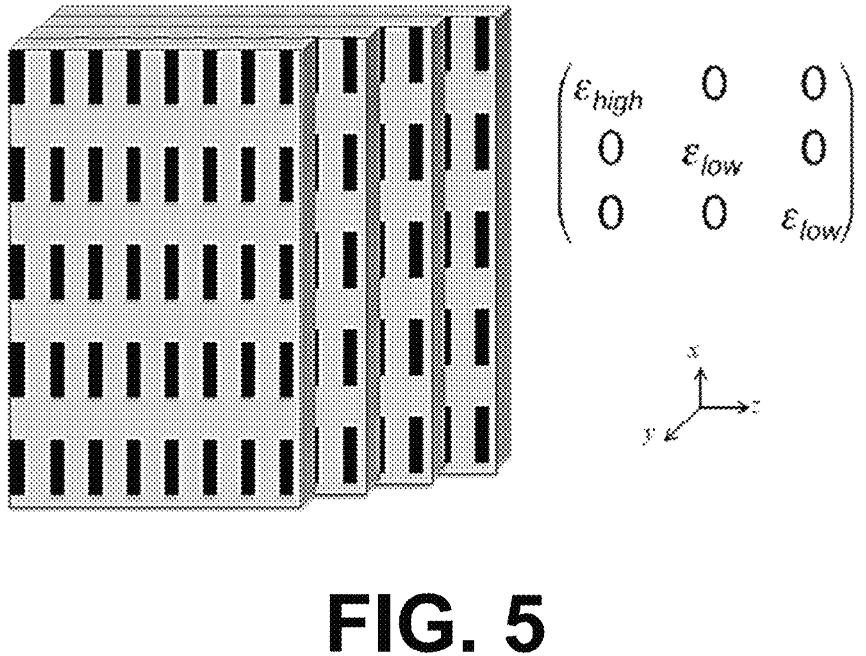
FIG. 5 illustrates an example of an artificial dielectric made of conductive sticks sandwiched between foam layers, in accordance with various embodiments of the present disclosure.

One approach to creating a man-made artificial dielectric is to place conductive sticks sandwiched with foam layers. FIG. 5 illustrates an example of an artificial dielectric made of conductive sticks sandwiched between foam layers. These conductive sticks form electric dipoles, which strongly interact with an incident E-field parallel to the long axis of each stick (i.e. the z-direction in FIG. 5). When the E-field is perpendicular to the sticks, the interaction is much weaker. As a result, this material has a strongly anisotropic dielectric permittivity tensor, as shown on the right side of FIG. 5. Namely, the permittivity will be high in the z-direction and low in the x- and y-directions.

Embedding an antenna structure inside an artificial material such as this provides several important advantages. First, most of the volume of this artificial material is foam, so it is especially light weight—much lower weight than even an unfilled plastic. Second, the specific dielectric permittivity that provides the best antenna performance can be engineered by changing the aspect ratio of the conductive sticks. Thus, setting an optimum permittivity is not restricted by available materials. Third, these shaped inclusions enable a highly directional permittivity—making it high only in the direction needed. In a conventional isotropic material, the permittivity is high in all directions, leading to higher-order trapped modes that cause the antenna to ring and be narrowband. With an anisotropic material, unwanted modes are reduced over conventional dielectric antennas. These three significant advantages to the dielectric material design contribute to realizing a reduced size/weight UHF/VHF antenna.

Figure 6:
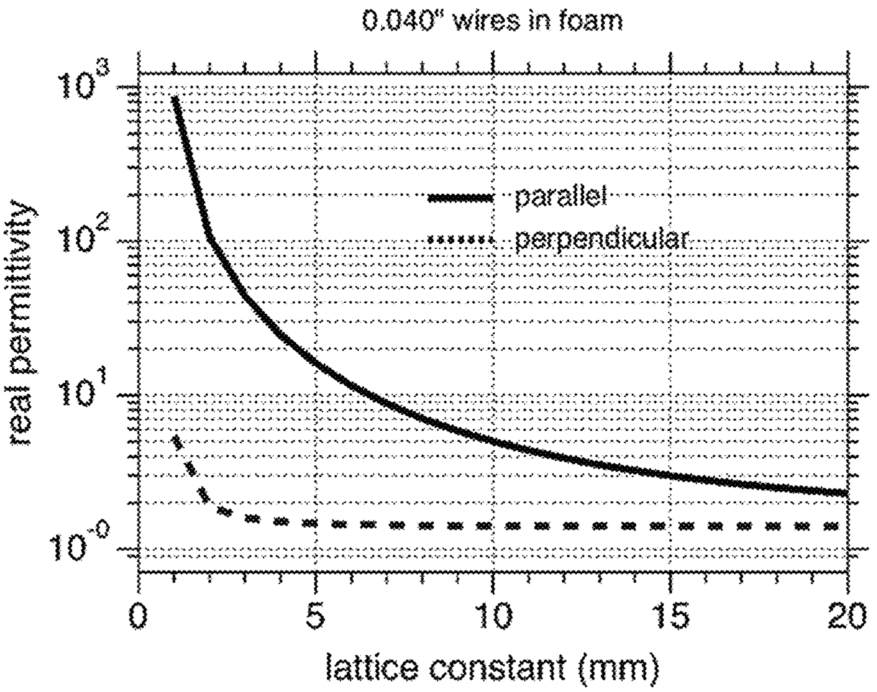
FIG. 6 illustrates an example of calculated effective permittivity of a lattice of 40 mil×1.5-inch wires as a function of packing density (lattice constant), in accordance with various embodiments of the present disclosure.

Two methods can be used for calculating the effective permittivity of an engineered artificial dielectric material. The first is by a physics-based effective medium calculation, such as the Maxwell-Garnett theory. An example of the effective permittivity of a lattice of wires is illustrated in the plot of FIG. 6, which shows the calculated permittivity for an array of 40 mil (about 1 mm) diameter sticks as a function of lattice constant. Curves are shown for permittivity parallel and perpendicular to the sticks. For example, foam-embedded sticks that are packed every 6.5 mm (about ¼ inch) will exhibit a dielectric permittivity of approximately 10 parallel to their direction and about 1.5 in the perpendicular directions. For more complex shapes, computational electromagnetic (CEM) codes based on finite element or finite-difference time-domain (FDTD) methods can be used with periodic boundary conditions to model an infinite slab of material. From this, transmission and/or reflection can be calculated and converted to effective dielectric permittivity. This effective permittivity tensor can then be used as an input for the antenna design optimization.

Figure 7:
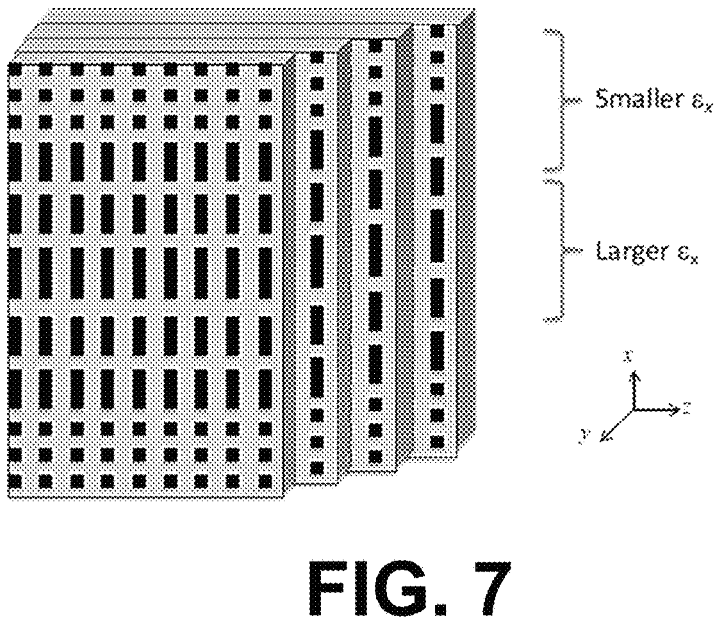
FIG. 7 illustrates an example of an artificial dielectric with an engineered dielectric gradient, in accordance with various embodiments of the present disclosure.

The use of artificial dielectric material also has another advantage that is generally unavailable in conventional materials. This advantage is the ability to engineer dielectric gradients, as shown in FIG. 7. In the example of FIG. 7, the sticks in the middle have a higher aspect ratio than the sticks on the upper or lower edges. Doing this makes the effective dielectric permittivity higher in the middle than on the edges, which has the effect of slowing down the wave front in the middle more than on the edges. In this way, the wave front internal to the antenna can be manipulated so that it is flat by the time it exits the antenna structure, enabling a more collimated wave emerging from the antenna (i.e. higher gain). A second advantage of spatially graded dielectric properties is that the antenna can be more effectively impedance matched to free space, increasing the antenna efficiency.

The flat lens antennas include several innovations such as, e.g.:

- FLAT shaping (similar to a skateboard),
- light-weight artificial dielectric (metamaterial-inspired) loading,
- anisotropic loading,
- gradient loading, and
- designed-in back/side-lobe absorption.

Initial Design Example

Figure 8:
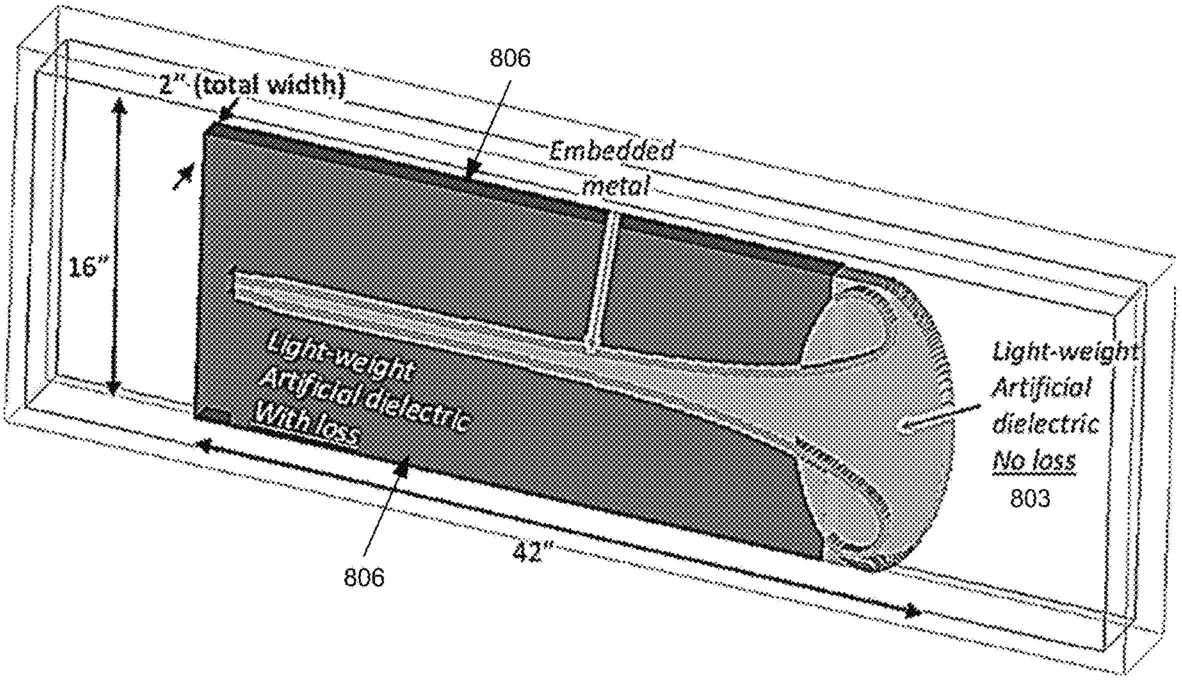
FIG. 8 illustrates an example of a flat lens antenna comprising bent metal TEM antenna arms with embedded two region artificial dielectric, in accordance with various embodiments of the present disclosure.

The geometry of the an initial, simplified FLAT embodiment design is shown in FIG. 8. Half of the width is not shown to allow the inside of the antenna to be visible in FIG. 8. As the image illustrates, the antenna is physically flat—only 2" wide. This form factor makes it very portable and easy to carry and store.

This initial design embodiment only uses two artificial dielectric material regions, that is, the "antenna throat", "antenna transition" and "antenna lens" regions use the same light-weight, artificial dielectric with no (or negligible) loss. This combined region of artificial dielectric 803, shown in lighter grey, is where the radiated fields are guided before exiting the antenna structure, and the low-loss is very beneficial. The "antenna back" material 806, shown in darker grey, is intentionally lossy to minimize back-lobe and side-lobe radiation. In both cases, the dielectric regions are assumed to be anisotropic, with a permittivity of about 3.6 in the direction parallel to the E-field polarization and a dielectric constant equivalent to moderate-density foam (ε~1.5) in the perpendicular directions. The low-loss material 803 was modelled as a conductivity of zero, while the lossy material 806 was modelled with a tensor conductivity of 0.10 S/m in the direction parallel to the E-field polarization and a lower 0.04 S/m in the directions perpendicular.

Flat lens antenna designs can be performed using computational electromagnetics (CEM) codes based on finite element or finite-difference time-domain (FDTD) methods. Time-domain solvers; such as FDTD, are preferred because from a single simulation a wide-band of frequency behavior can be computed. FIG. 9A shows the computed forward (solid line) and backward (dashed line) radiation from this initial embodiment. These data show a directivity that is about 5 dB at 200 MHz and increases as frequency goes up. The energy in the backward direction is 10 dB lower at the lowest frequency and drops to more than 25 dB lower than the forward radiation as frequency goes up. The distance between these two dBi curves is called the "front-back" ratio. The "front-back" ratio is shown to increase from 10 dB to above 30 dB across the 0.2-2.0 GHz band. Large "front-back" ratios are important for many antenna usage cases.

FIG. 9B shows the computed voltage standing wave ratio (VSWR) as a function of frequency. In general, values<2 are "preferred" and <3 are "acceptable" for many antenna usage cases. The initial flat lens antenna embodiment exhibits an excellent VSWR over almost the entire band.

To put this calculated performance into perspective, FIG. 10 shows a direct comparison of some of the salient parameters between the initial flat lens antenna embodiment of FIG. 8 and a conventional horn antenna. The horn antenna used for comparison is a commercially available SH-200 manufactured by MVG. To provide a similar comparison, the flat lens antenna was designed to have the same length, 42", as the COTS (commercial off the shelf) horn antenna. However, as the table of FIG. 10 shows, the flat lens antenna (FLAT initial embodiment) is only 2" wide versus the almost 3-foot width of the horn. Additionally, the height of the flat lens antenna is less than that of the COTS horn antenna. So the FLAT design is overall a significantly smaller antenna than the COTS horn antenna. Assuming a typical weight for moderate-density foam, along with some added weight for the internal metal parts, the estimated total weight of the flat lens antenna should be well under 15 lbs. In contrast, the COTS horn antenna has a weight of 55 lb. Finally, the directivity calculated from the flat lens antenna is about 5 dBi at 200 MHz and ranges up to almost 13 dBi at 2 GHz. The vendor stated gain for the COTS horn is similar—ranging from 6 to 15 dBi. That is, the initial FLAT embodiment will out-perform equivalent COTS antennas in terms of size and weight while maintaining similar directivity.

Simplified "Antenna Back" Material Example

The initial flat lens embodiment as discussed above utilized anisotropic, lossy and low-less, dielectric materials with a dielectric constant of 3.6 parallel to the desired electric field direction and about 1.5 in the other two directions. One method for realizing the desired amounts of loss is to vary the conductivity (σ) of wire inclusions.

Figure 11:
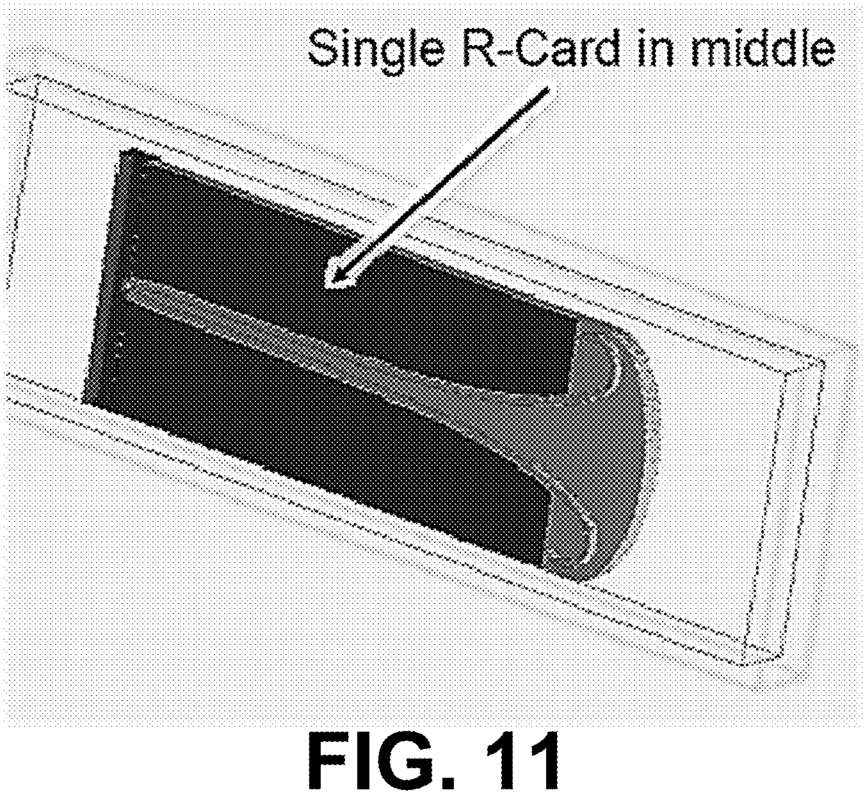
FIG. 11 illustrates an example of a flat lens antenna utilizing a simplified "antenna back" material, in accordance with various embodiments of the present disclosure.
Figure 12:
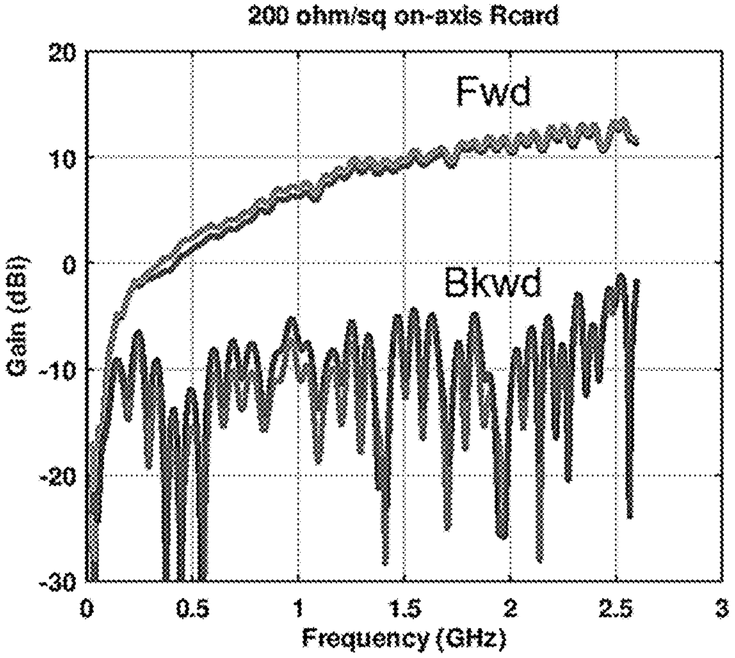
FIG. 12 is a plot illustrating a comparison of the flat lens antenna of FIG. 8 and flat lens antenna of FIG. 11, in accordance with various embodiments of the present disclosure.

Another, simpler method is to realize the loss with a single resistive card (Rcard) with a sheet impedance, $Z_{sheet}$, placed on the plane of symmetry of the antenna as shown in FIG. 11. It was determined that choosing $Z_{sheet}=1/\sigma d$ where d is the antenna width (e.g., 2 inch=50.8 mm) led to comparable performance. FIG. 12 shows a comparison of antenna gains in forward and backward directions for the flat lens antenna embodiment of FIG. 8 and the flat lens antenna embodiment of FIG. 11, where $Z_{sheet}=1/(0.10*50.8\text{ mm})\sim 200$ ohms/sq. The differences are minor and in general this simplified approach to realizing the loss is preferred.

Sensitivity to Loss in the "Throat", "Transition" and "Lens" Regions

Figure 13:
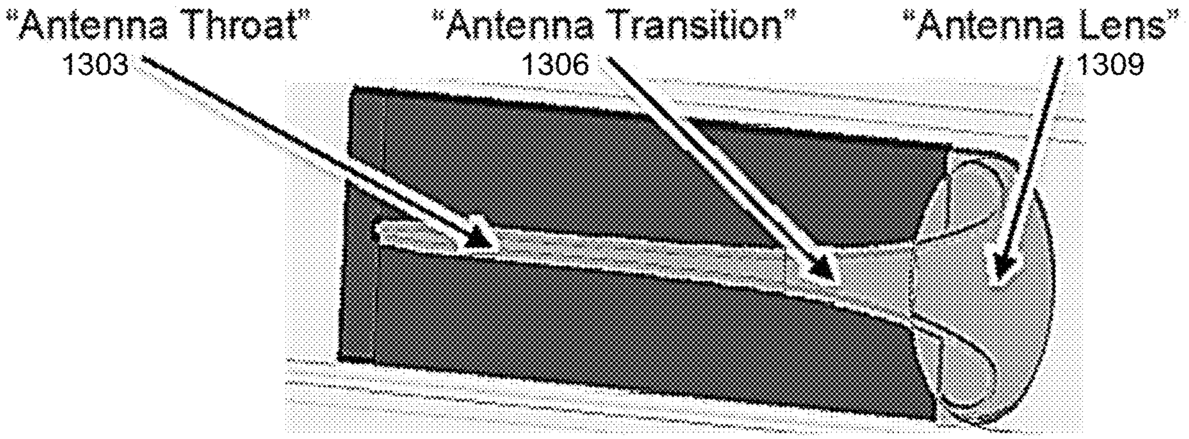
FIG. 13 illustrates an example of a flat lens antenna with low-loss material broken into three regions, in accordance with various embodiments of the present disclosure.

As foreshadowed with the discussion of FIG. 3, the sensitivity of antenna radiation is related to where in the structure, finite (non-zero) conductivity is present. Practically speaking, unless the conductivity of the metallic inclusions is very high, the anisotropic, meta-material shown in FIG. 5 will likely have some loss. Hence, in practice it was found to be advantageous to choose different materials for the "throat" 1303, "transition" 1306 and "lens" 1309 regions as illustrated in FIG. 13. The end of the throat 1303 and beginning of the transition 1306 is determined based on the separation of the antenna arms and the size of the wire inclusions. For example, as a first rule-of-thumb, the transition 1306 can start when the spacing between the arms is roughly the size of the wire inclusions used in the man-made, anisotropic dielectric material.

Figure 14:
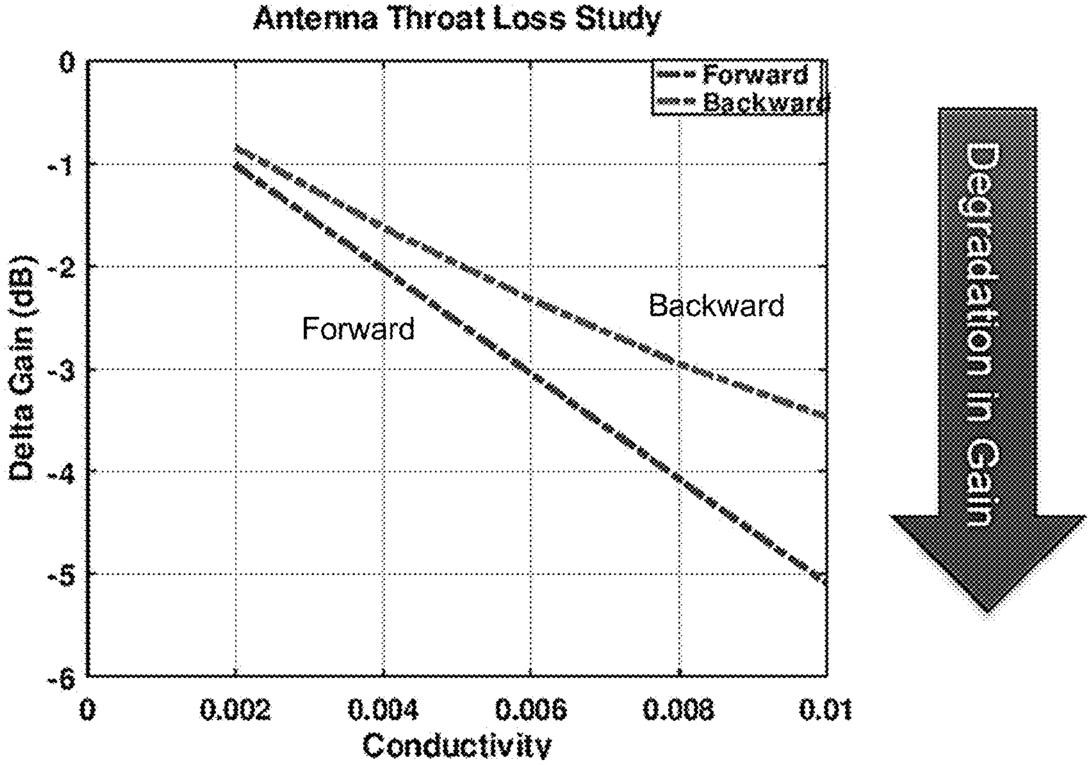
FIGS. 14-16 illustrate the effect of loss in the three regions of FIG. 13, in accordance with various embodiments of the present disclosure.

The effect of loss in the "antenna throat" 1303 region is shown in FIG. 14. Note that as the conductivity (or loss) of the effective material properties increases both the forward and backward antenna gains are degraded by the loss. In fact, the forward gain degrades faster than the backward gain resulting in decreasing front/back ratio. To mitigate this loss sensitivity in other embodiments, the antenna throat material can be chosen to be a low-loss commercial plastic or machinable foam. In some embodiments, a 3D printed polymer (unfilled or with varying fill fractions) can be used to optimize the dielectric constant. Machined holes in unfilled polymer can also be used. Because the throat material is not a significant fraction of the total antenna volume, using a commercially available plastic or machinable foam will not significantly increase the total weight.

Figure 15:
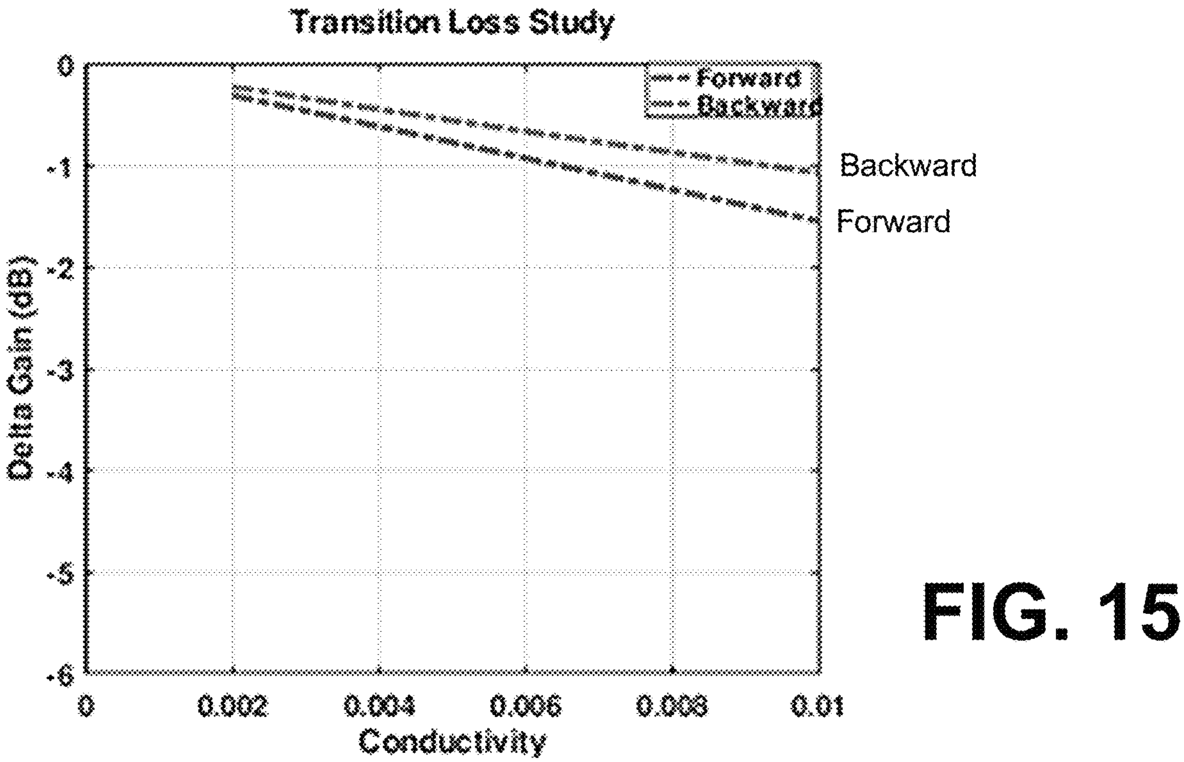
Figure 16:
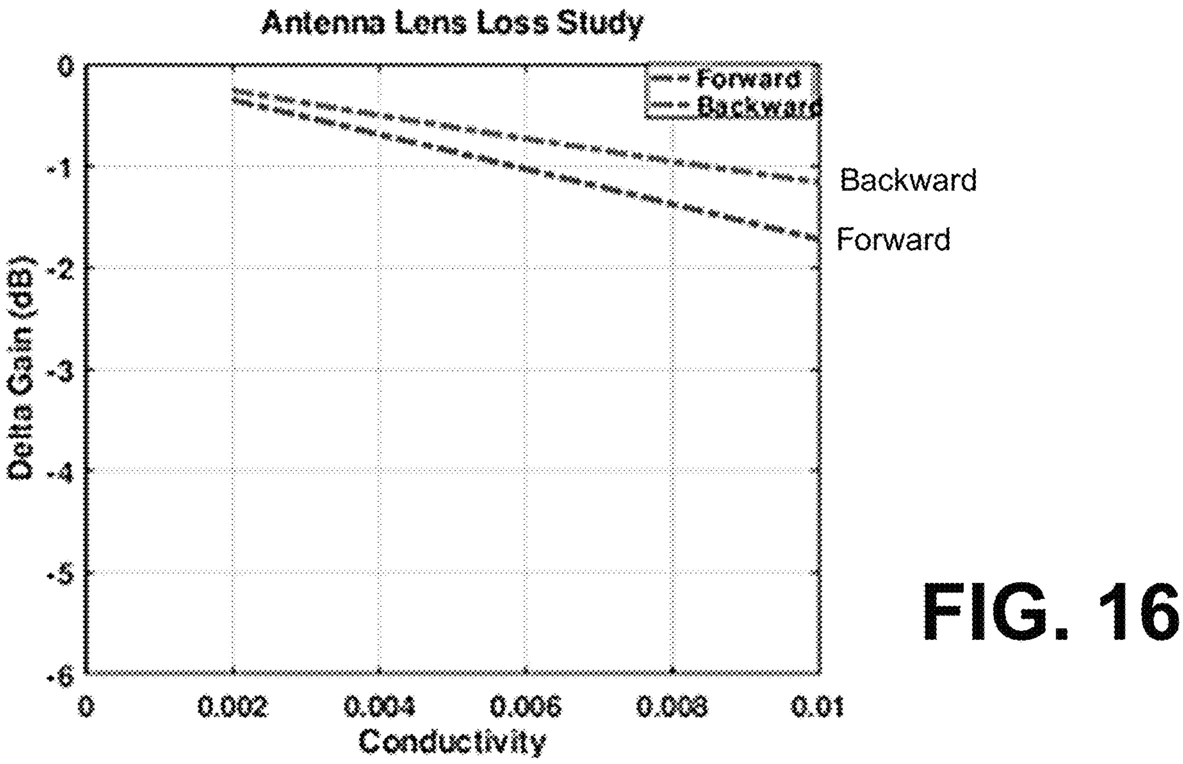

The sensitivity to finite-conductivity (i.e., non-zero loss) in the "antenna transition" 1306 and "antenna lens" 1309 regions is shown in FIGS. 15 & 16. Both regions are significantly less sensitive than the "throat" 1303 region and thus man-made, artificial dielectric materials may be tolerated in these two regions.

Figure 61:
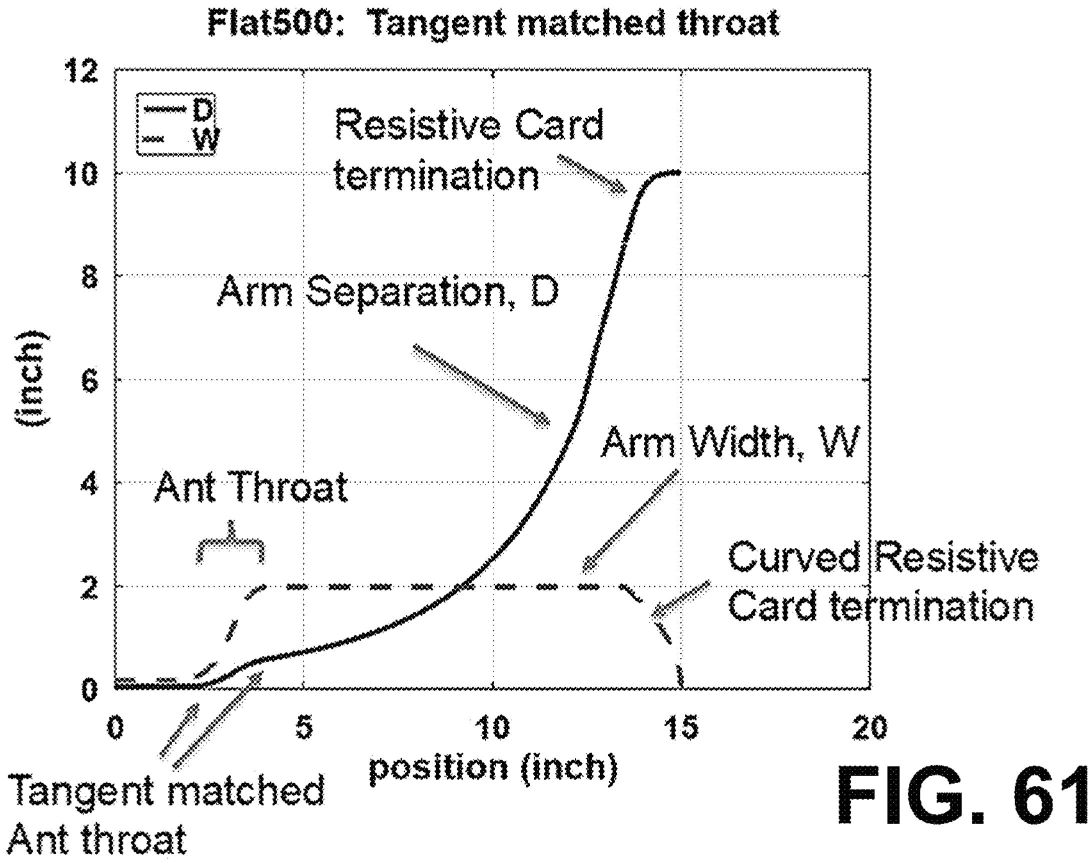
FIGS. 61 and 62 illustrate examples of antenna arm width and separation, in accordance with various embodiments of the present disclosure.

Sensitivity to Slope Discontinuities in the "Throat", "Transition" and "Lens" Regions The shape of the antenna arm should have no or at least minimal slope discontinuities in the arm spacing, D, throughout the antenna. Any discontinuities in the "Throat" region 1303 may be highly troublesome and can lead to higher reflection loss (i.e., higher VSWR) and gain loss. Tangent matching the antenna arm in the "throat" 1303 to the balun board and to the antenna arm in the "transition" 1306 is illustrated in FIG. 61, which shows antenna arm width and separation, which is bent to the resistive card termination and tangent matched antenna throat.

Antenna Feed: "Balun" Chips

Figures 17, 18:
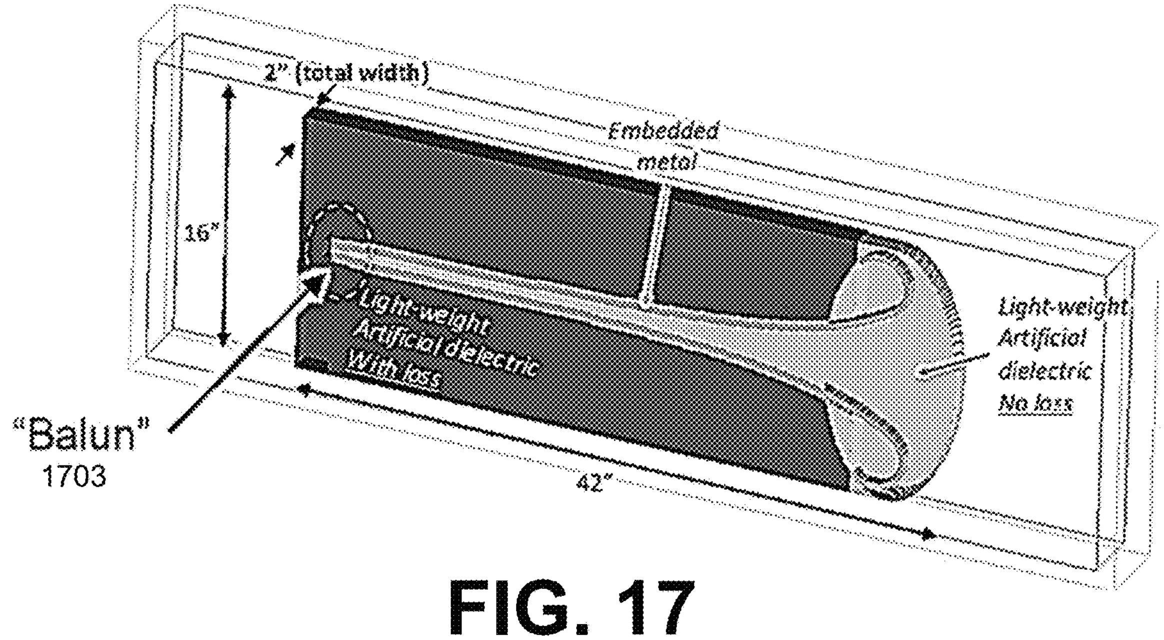
FIG. 17 illustrates a balun included in the flat lens antenna of FIG. 8, in accordance with various embodiments of the present disclosure.
FIG. 18 is a table illustrating examples of commercial chip baluns, in accordance with various embodiments of the present disclosure.

The pair of electrically thin ($W \ll \lambda_{high}$), highly conducting, TEM mode antenna arms is a symmetrical structure that should be excited or fed in a balanced manner. FIG. 17 illustrates a balun included in the flat lens antenna of FIG. 8. However, electromagnetic test equipment (i.e. network analyzers or radars), or communication equipment (i.e. radios), etc. utilize unbalanced coaxial lines to carry signals between the components. Conversion from balanced to unbalanced and vice-versa is accomplished using "BALUN" devices or structures. The location of the "BALUN" 1703 in the initial flat lens antenna embodiment is shown in FIG. 17 with a white dashed circle.

One approach for realizing this conversion of signaling from balanced to unbalanced is to use commercially available chip BALUNs. FIG. 18 illustrates four examples of commercial chip BALUNs from three manufacturers. The second column shows that all four BALUNs cover the UHF and VHF bands. The third column shows that one of the chips even provide a 1:4 impedance step from unbalanced to balanced. The fourth column shows the technology utilized.

Figure 19:
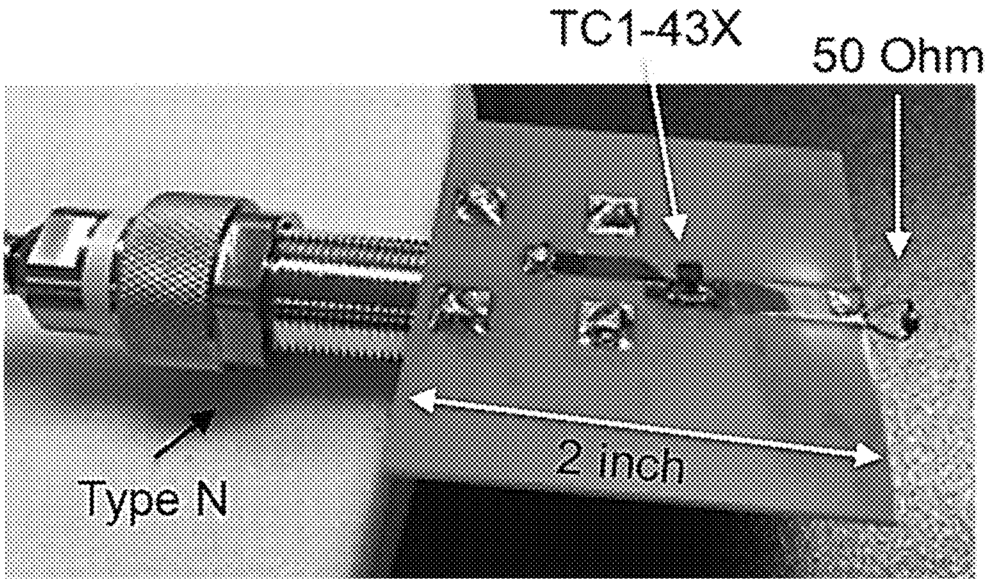
FIG. 19 is an image of a fabricated printed circuit board (PCB) which uses a balun chip for exciting a flat lens antenna, in accordance with various embodiments of the present disclosure.

FIG. 19 shows a photograph of a fabricated printed circuit board (PCB) which uses the TC1-43X balun chip for exciting a FLAT antenna prototype. The unbalanced signal arrives from the left side in the coaxial line. The coaxial line connects to the PCB via a Type N connector to microstrip line transition. The unbalanced signal in the microstrip line enters the BALUN chip from the left side and a balanced signal exits the chip on the right side in a pair of symmetrical conductors. The right-hand side of this "Balun board" is typically attached to the pair of TEM antenna arms using solder. However, FIG. 19 shows that in testing it is often convenient to solder a 50-ohm resistors across the output to allow the testing to focus on the "Balun board". In fact, it was found that soldering two 100-ohm resistors in parallel across the output provides a better microwave termination than a single 50-ohm resistor.

Antenna Feed: Geometric Balun

Figure 20:
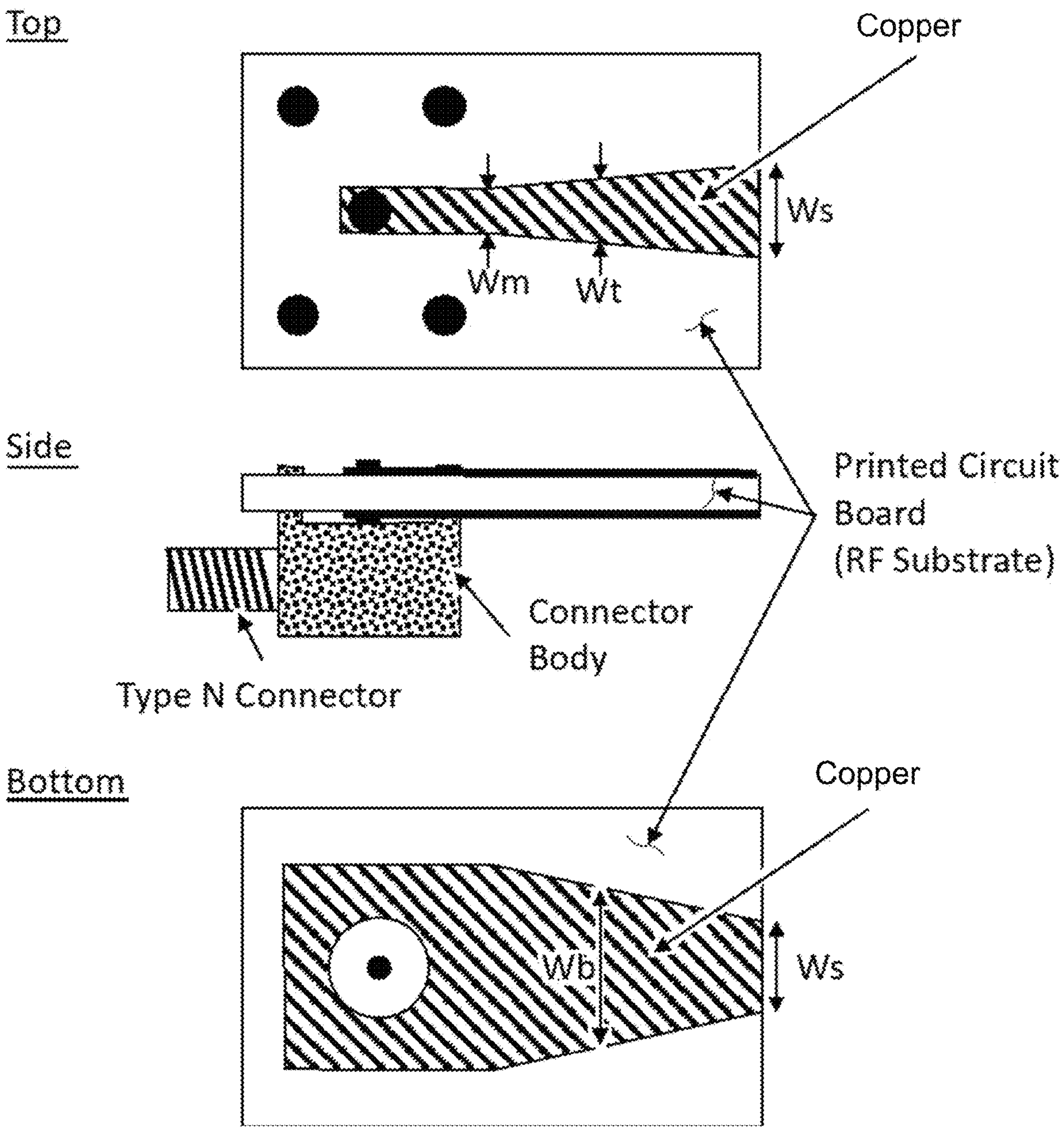
FIG. 20 illustrates an example of a geometric balun, in accordance with various embodiments of the present disclosure.

In another embodiment, a geometric balun is used to convert from unbalanced to balanced signals. FIG. 20 shows a "balun" printed circuit board that uses shaping of the metallic traces instead of a chip balun to realize the conversion. As with the chip balun based board, the coaxial line connects to the PCB via a Type N connector to microstrip line transition of width Wm. Wm is chosen to yield a 50-ohm impedance. The width of the bottom copper is tapered down over the remaining board length to a width Ws. Similarly, the width of the top conductor is tapered slowly up over the remaining board length to the same width Ws. During this taper, the width of the top conductor, Wt, and the width of the bottom conductor are such that the impedance of the TEM line maintains 50 ohms. Full-wave computational electromagnetic codes (CEM) can be used to precompute tables that give Wt for a given Wb and/or Wb for a given Wt that maintain 50 ohms.

Antenna Feed: Infinite Balun

Figure 21:
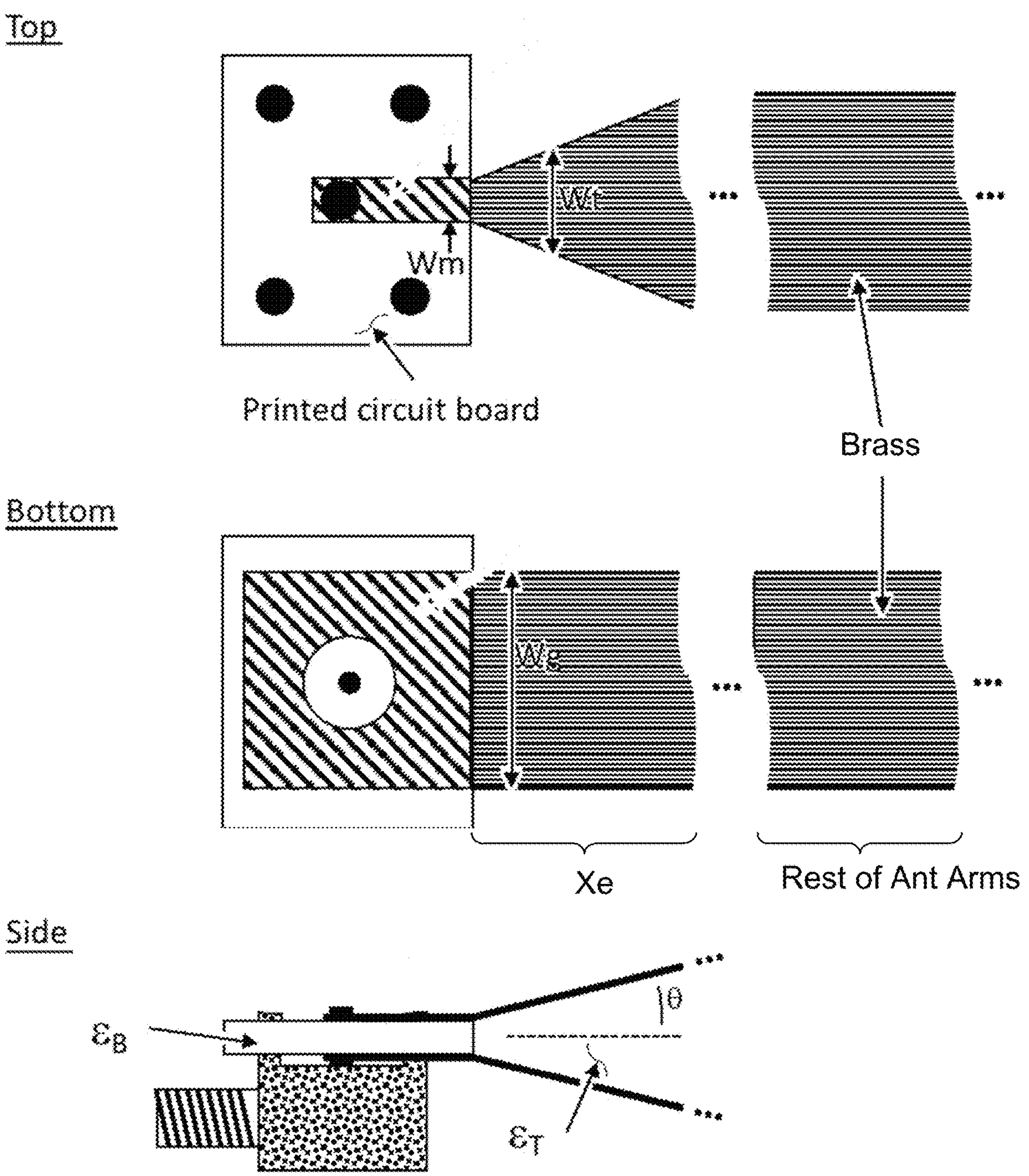
FIG. 21 illustrates an example of an infinite balun, in accordance with various embodiments of the present disclosure.

In another embodiment, an Infinite balun is used to convert from unbalanced to balanced signals. FIG. 21 shows a PCB and the starting portions of the two TEM arms of a FLAT antenna. As with the previous two balun embodiments, the coaxial line connects to the PCB via a Type N connector to microstrip line transition. However, no conversion from unbalanced to balanced signaling is performed in the PCB. The conversion is realized in the first Xc inches of the antenna arms. That is, assuming that the dielectric constant of the throat, $\varepsilon_T$, equals the dielectric constant of the PCB, $\varepsilon_B$, the top antenna arms starting width would be Wm, and the bottom arms starting width would be Wg to maintain 50 ohms. However, in practice, $\varepsilon_T \neq \varepsilon_B$, because different materials are chosen, and hence Wt is adjusted based on Wg and $\varepsilon_T$ to maintain 50 ohms at the interface between PCB end and antenna arms start. Over the majority of the "antenna throat", the antenna arm width is slowly increased until it matches the width of the bottom conductor. Note that during the conversion from unbalanced to balanced in the "antenna throat" the impedance of the TEM arms is following the desired antenna impedance profile and not being held at a constant 50 ohms as done in the "geometric balun".

TEM Antenna Arms

Figure 22:
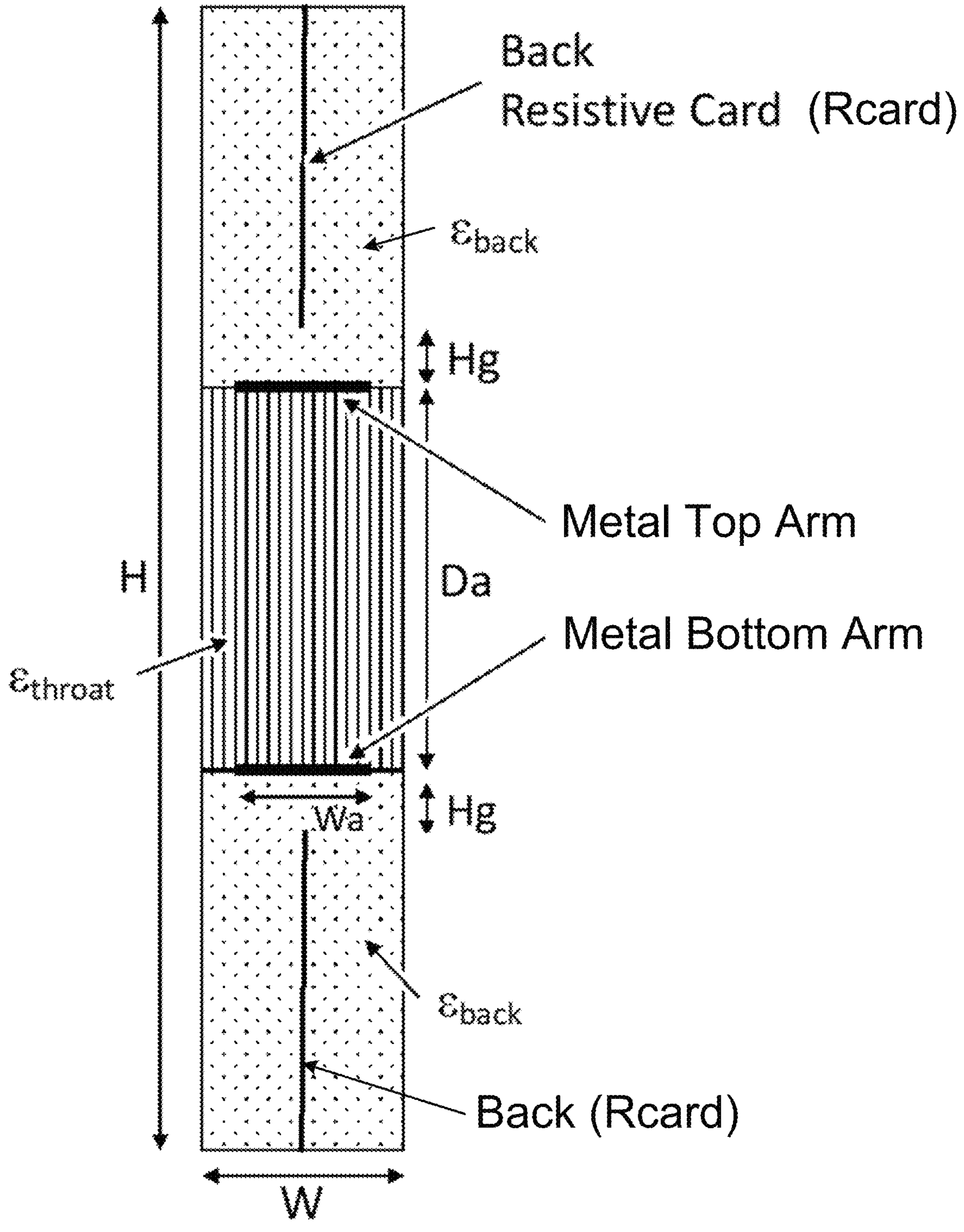
FIG. 22 is a cross-sectional view illustrating an example of the antenna throat of a flat lens antenna, in accordance with various embodiments of the present disclosure.

The impedance of the two TEM antenna arms is a function of the arms width, Wa, the separation of the arms, Da, the dielectric constant of the antenna regions, and the total height & width of the flat lens antenna, H & W, as shown in the cross section of the "antenna throat" in FIG. 22.

Figure 23:
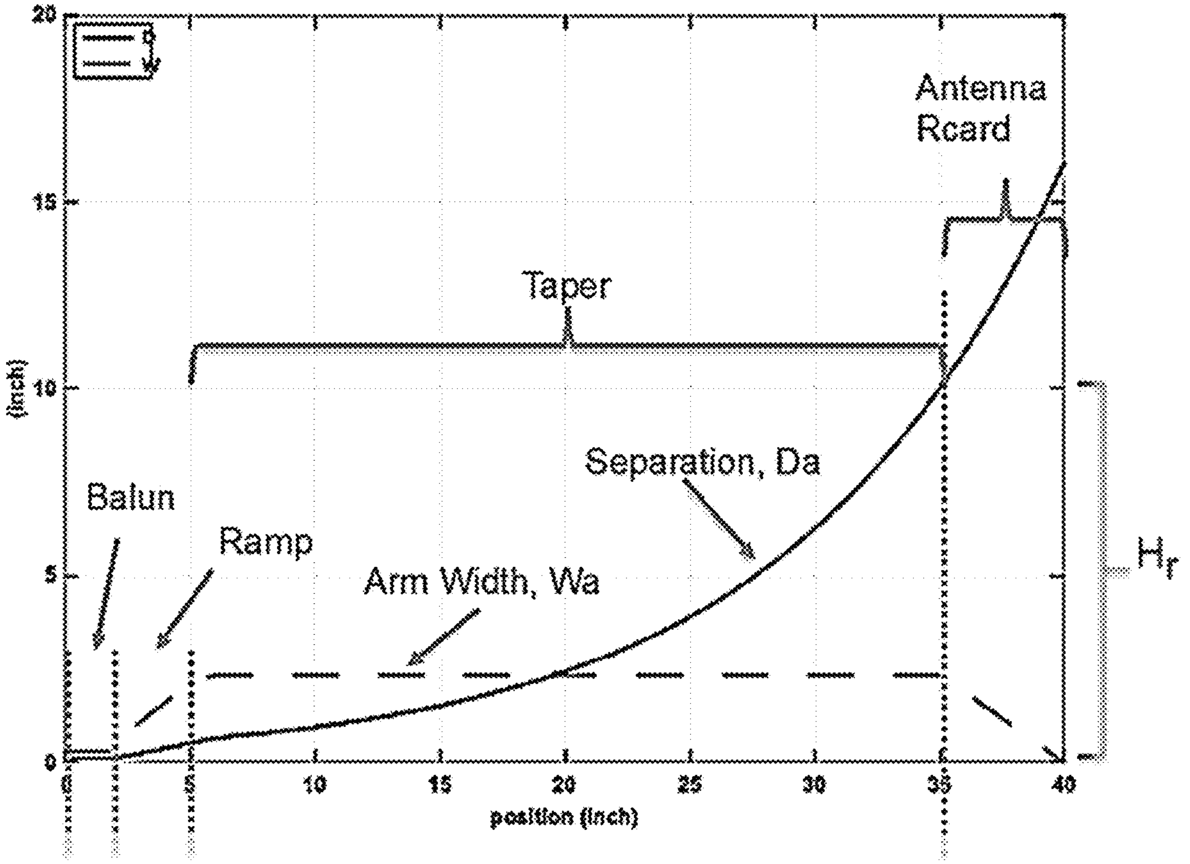
FIGS. 23 and 24 illustrate examples of antenna arm configurations, in accordance with various embodiments of the present disclosure.
Figure 24:
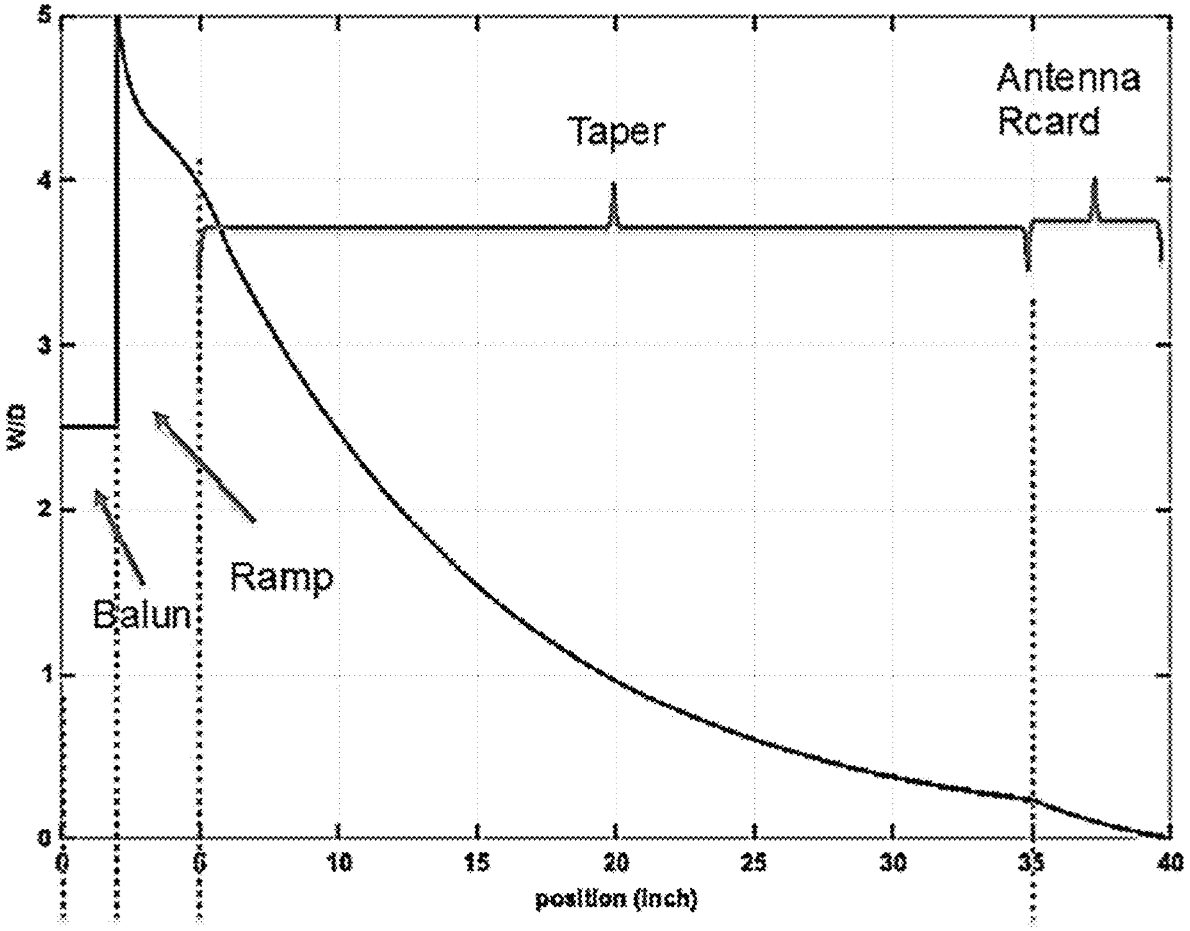

One approach to taper the antenna impedance is based on a theory of incremental reflections. That is, to avoid a large reflection from the antenna end, it is better to slowly reflect the wave along its length using a taper. In fact, to achieve a broadband antenna, it is preferred if the incremental reflections are roughly equal along the antenna. To achieve this the antenna arm width Wa and separation Da are tapered as shown in FIG. 23. FIG. 23 is one embodiment of a L=40", H=16", W=2" flat lens antenna. Another way to look at the antenna arms is to look at the ratio of arm width to separation (W/D) as shown in FIG. 24.

Note that the first two inches is the balun board where the balanced output has a fixed Wa, Da and hence a constant W/D.

The next three inches is the "ramp". The ramp is the starting portion of the "antenna throat" where the antenna arm separation is increased linearly and the arm width ramps from the starting width to a final fixed arm width (Wfinal~Wflat) that is typically just smaller than the FLAT antenna width. Using computational electromagnetic (CEM) codes, it was determined that a small quadratic correction to the arm width achieved the best antenna performance.

For the next 35 inches (about 87.5%) of the antenna, the separation, Da, of the antenna arms increases exponentially. Best performance was obtained when the whole height, H, of the FLAT antenna was utilized. In practice the final height, Hfinal, is smaller than H for fabrication issues (e.g., wall thickness, etc.).

For the first 30 inches of this exponential taper, denoted "taper" in FIGS. 23 and 24, the antenna arm width is fixed, and the arms are fabricated with highly conducting materials such as brass or copper shim stock, or etched copper conductor on a thin flexible printed circuit board (such as, e.g., Kapton).

For the final 5 inches of this taper, denoted "Antenna Rcard" in FIGS. 23 and 24, the antenna arm width is linearly tapered to zero, and the arms were fabricated using commercially available Rcard materials. One source of these materials is window tint vendors. Other approaches include using printed circuit boards with resistive foil from vendors such as, e.g, Omega Technologies and Ticer Technologies, and/or silk screen printing with resistive inks and paints. The RF properties of these partially conducting materials is characterized by a sheet impedance with units of ohms/square. It was found that the best designs utilized materials with impedances of about 50-200 ohms/square. In practice, this final portion is formed as a triangle with an extra small rectangle region for allowing it to be partially overlapped over the final portion of the metallic arms.

Note that the transition from metallic antenna arms to Rcard is parameterized as Hr/H where a typical value is about 0.6, however other ranges for Hr/H can be used. For example, Hr/H can be in a range from about 0.2 to about 0.8, and it has been seen that a range of about 0.4 to about 0.6 provides improved operation.

Height

Figure 25:
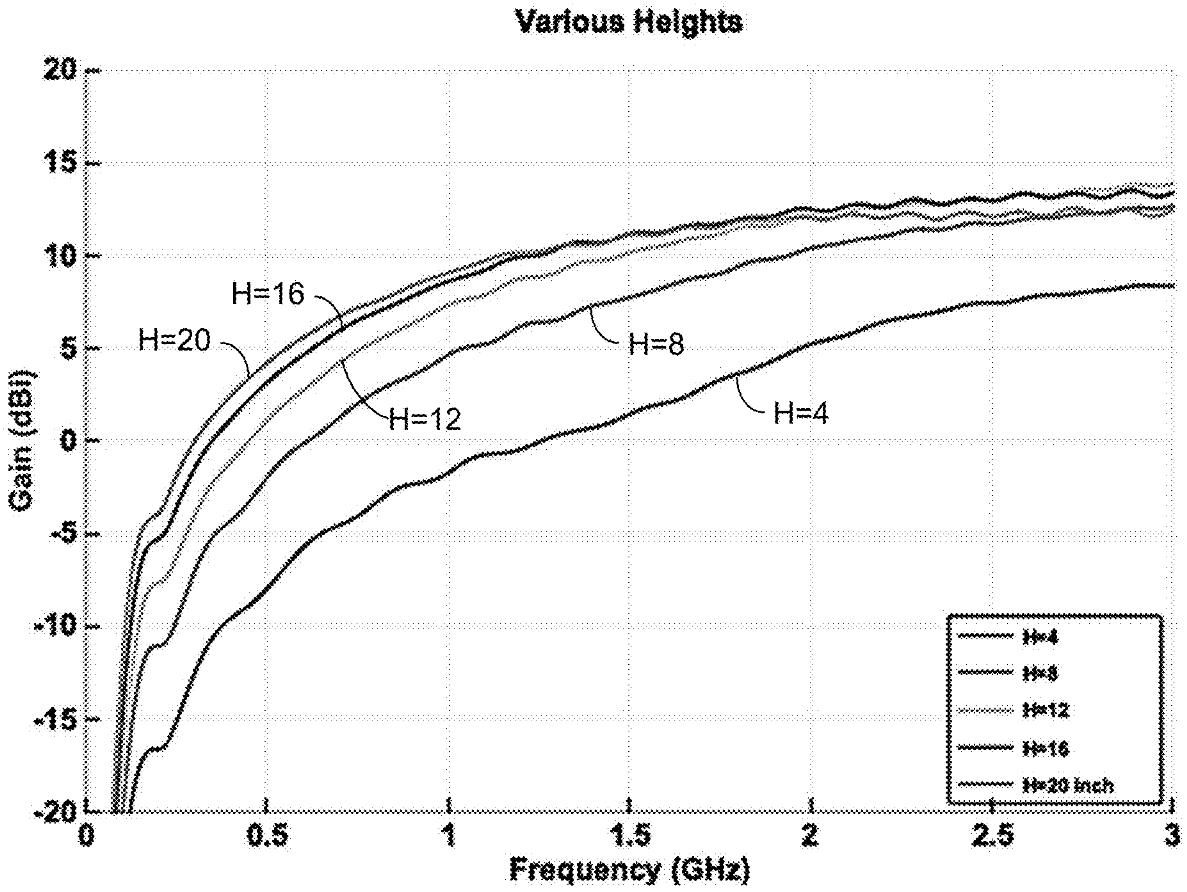
FIGS. 25-31 illustrate examples of the effects of height, length and width on a flat lens antenna design, in accordance with various embodiments of the present disclosure.
Figure 26:
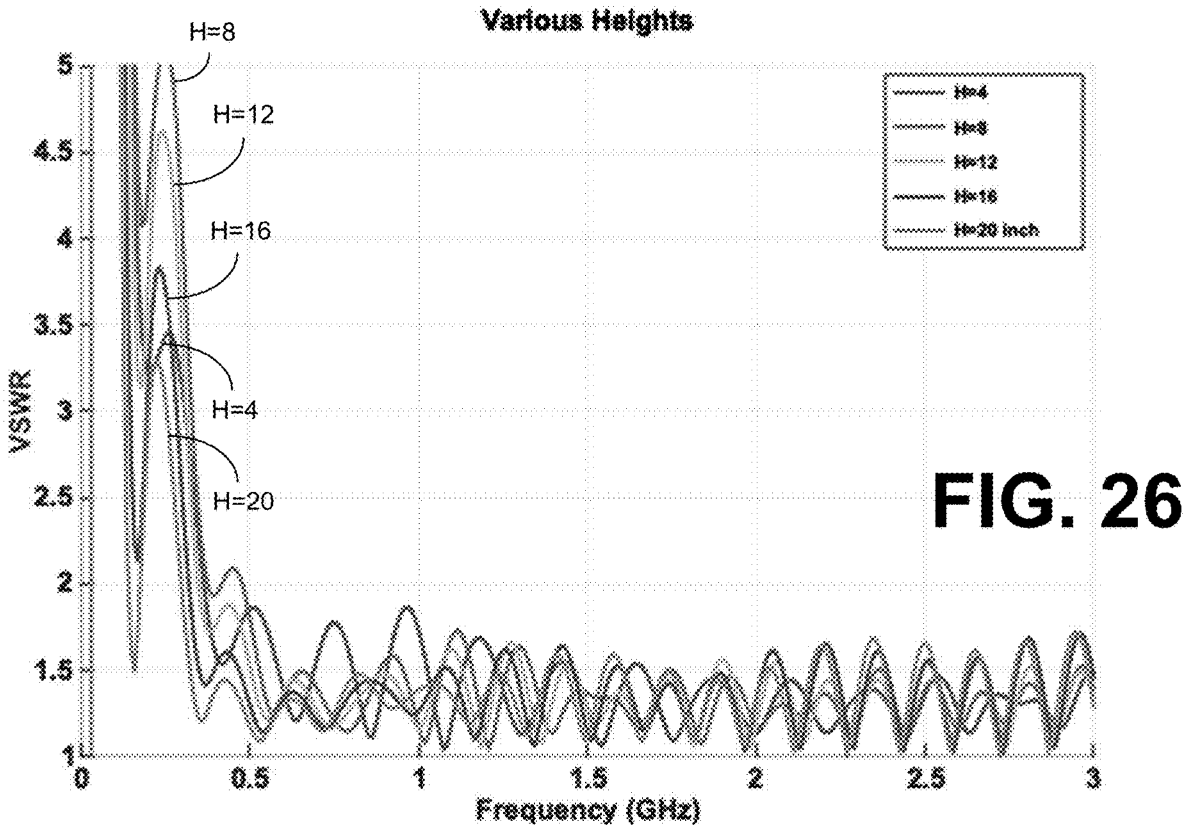

Fixing all the other parameters (e.g., L=30", W=2", Hr/H, Hg, dielectric constants, Rcard values, lens size and shape, etc.), the trade-off between antenna height, H, and lowest frequency of operation was obtained using CEM models of the antenna. FIG. 25 shows the forward gain, G, as a function of frequency across the UHF and VHF bands for several antenna heights. FIG. 26 shows the corresponding VSWR of the antenna.

Figure 27:
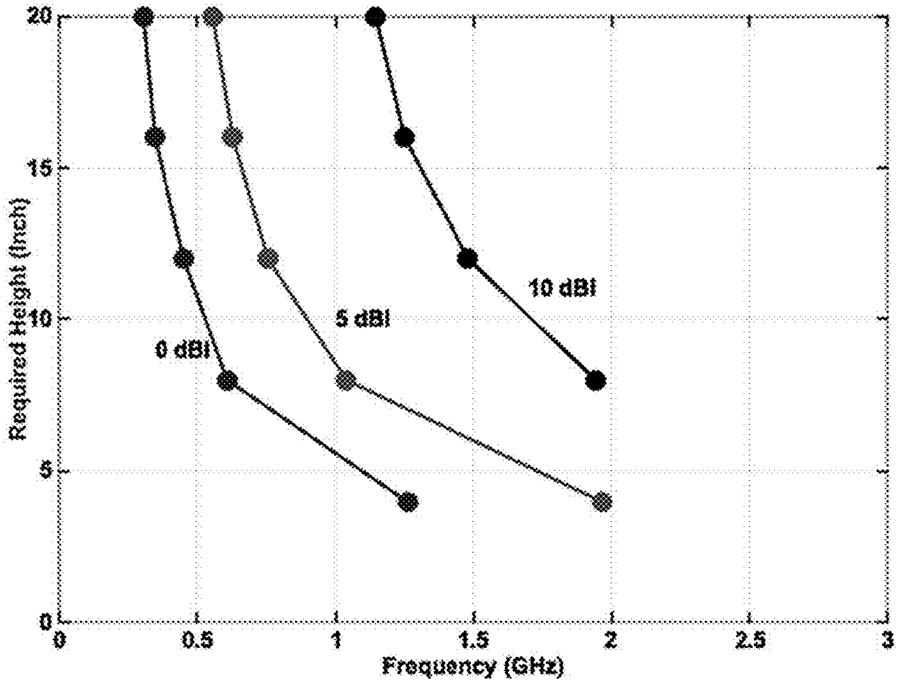

As a rule of thumb, the desired lowest frequency of operation and minimum gain is used to pick the height of the flat lens antenna. FIG. 27 shows this trade-off for these fixed other parameters. There is, of course, some dependence on the other parameters (e.g., L, W, Hr/H, Hg, dielectric constants, Rcard values, etc.).

Length

Figure 28:
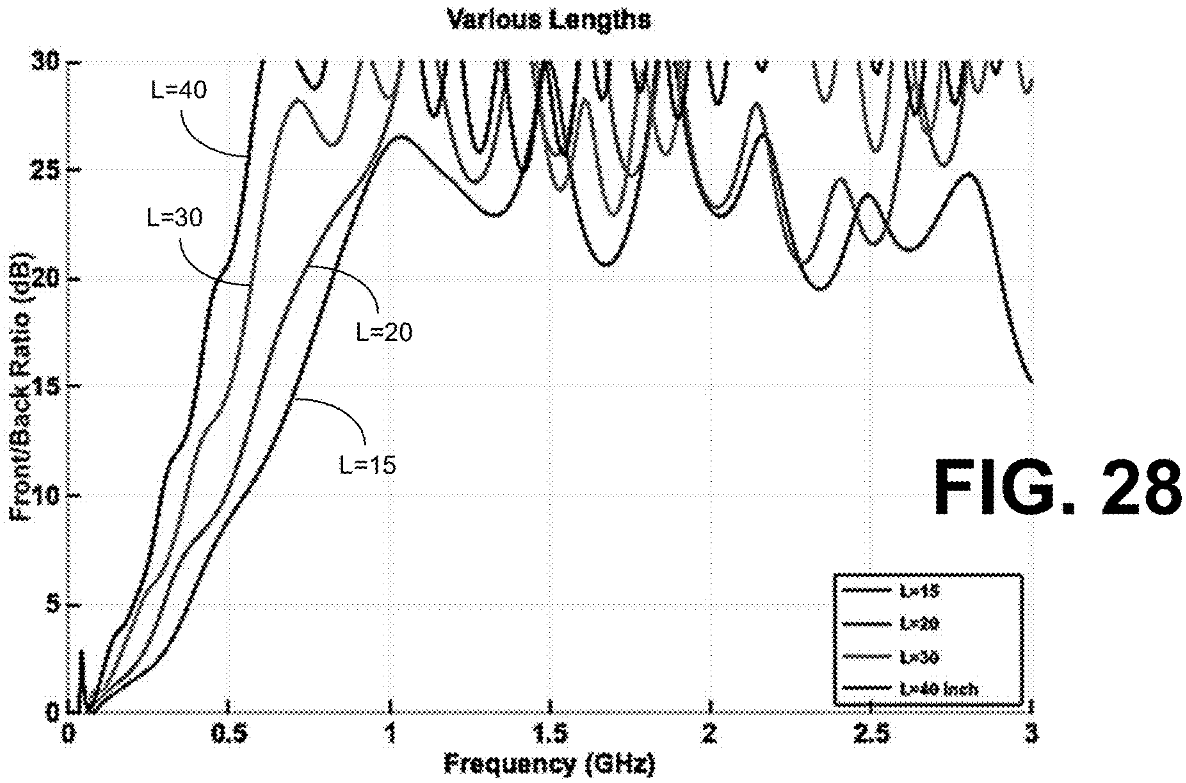

Fixing all the other parameters (e.g., H, W, Hr/H, Hg, dielectric constants, Rcard values, lens size and shape, etc.), the trade-off between antenna length, L, and "front/back" (F/B) ratio is obtained using CEM models of the antenna. FIG. 28 shows the F/B ratios a function of frequency across the UHF and VHF bands for several antenna lengths. Notice that as the antenna length increases the F/B ratio extends to lower frequencies and increases.

Figure 29:
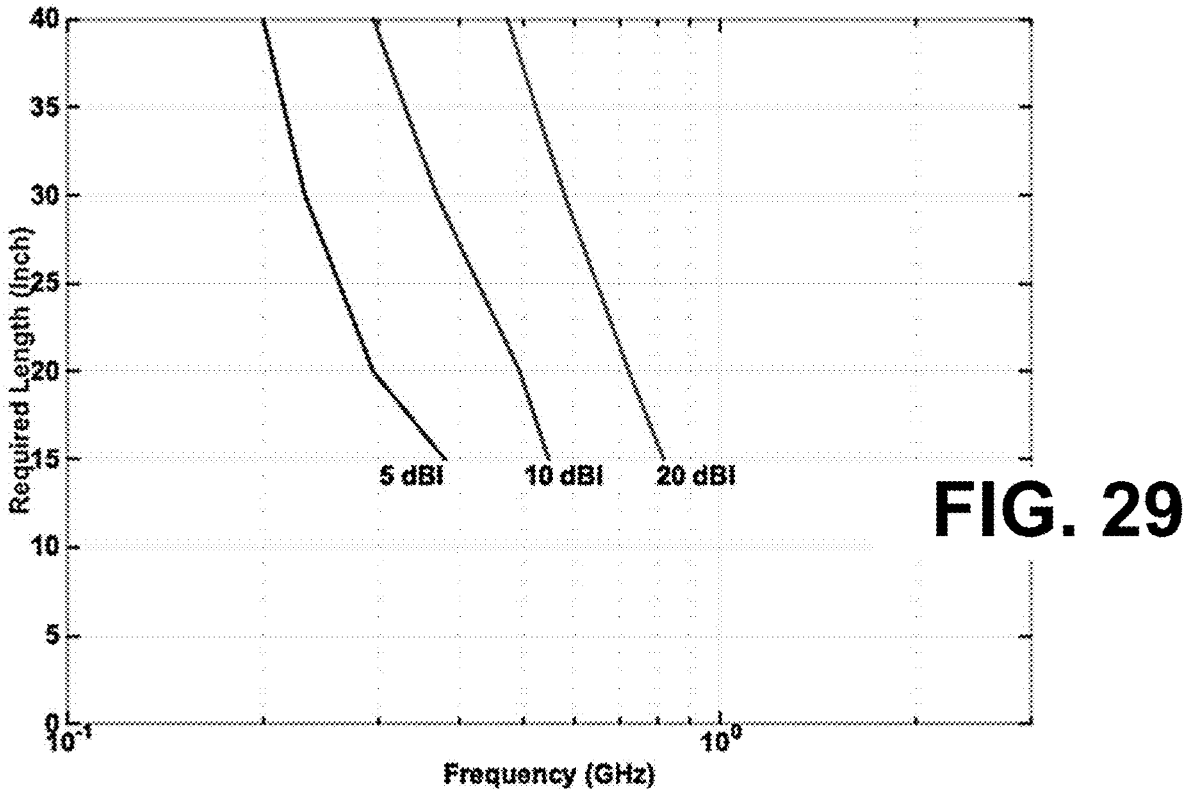

As a rule of thumb, the desired F/B ratio and lowest frequency of operation is used to pick the length of the flat lens antenna. FIG. 29 shows this trade-off for these fixed other parameters. There is, of course, some dependence on the other parameters (e.g. H, W, Hr/H, Hg, dielectric constants, Rcard values, etc.).

Width

Figure 30:
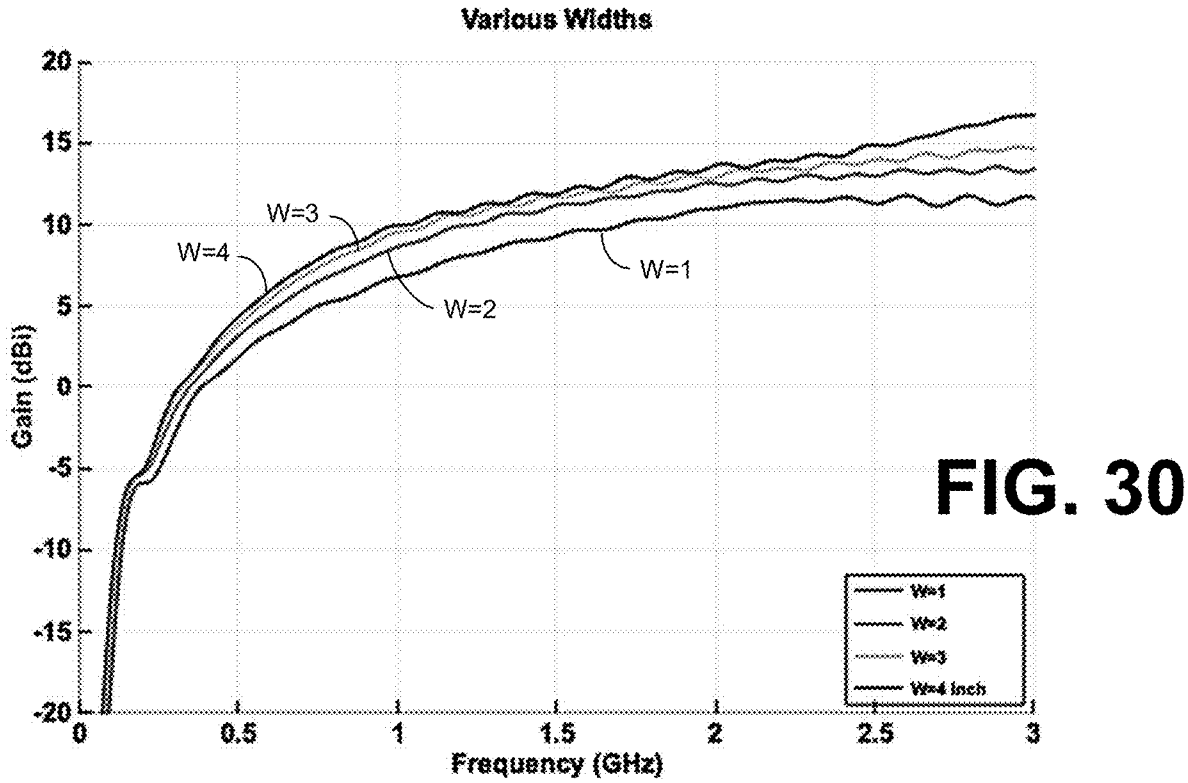

Fixing all the other parameters (e.g., L, H, Hr/H, Hg, dielectric constants, Rcard values, lens size and shape, etc.), the trade-off between antenna width, W, and forward gain is obtained using CEM models of the antenna. FIG. 30 shows the forward gain, G, as a function of antenna width. In general, wider is better especially at frequencies above 400 MHz (for this set of fixed other parameters).

Figure 31:
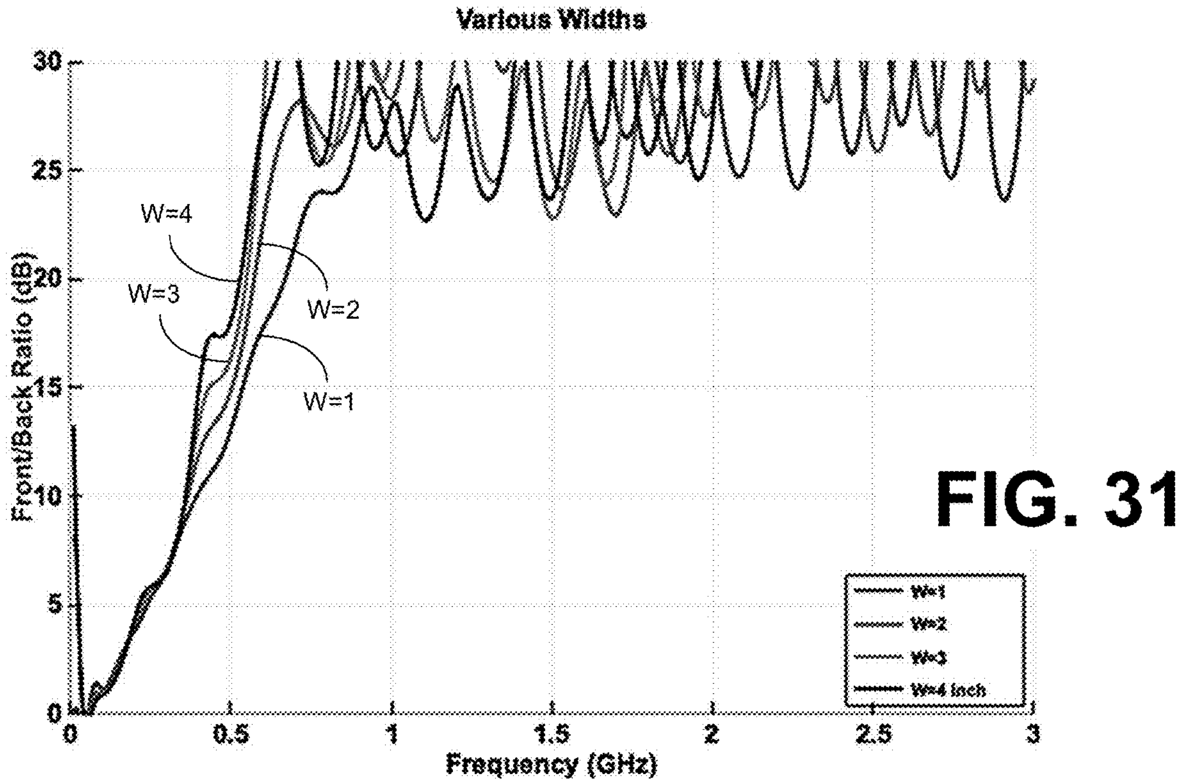

FIG. 31 shows the F/B ratio as a function of antenna width. Again, width is not a major driver of F/B ratio below 400 MHz. Thus, as a rule of thumb for low frequency flat lens antennas, the width can be chosen based on mechanical design considerations such as, e.g., stiffness.

Antenna Rcard Relative Transition Height

Figure 32:
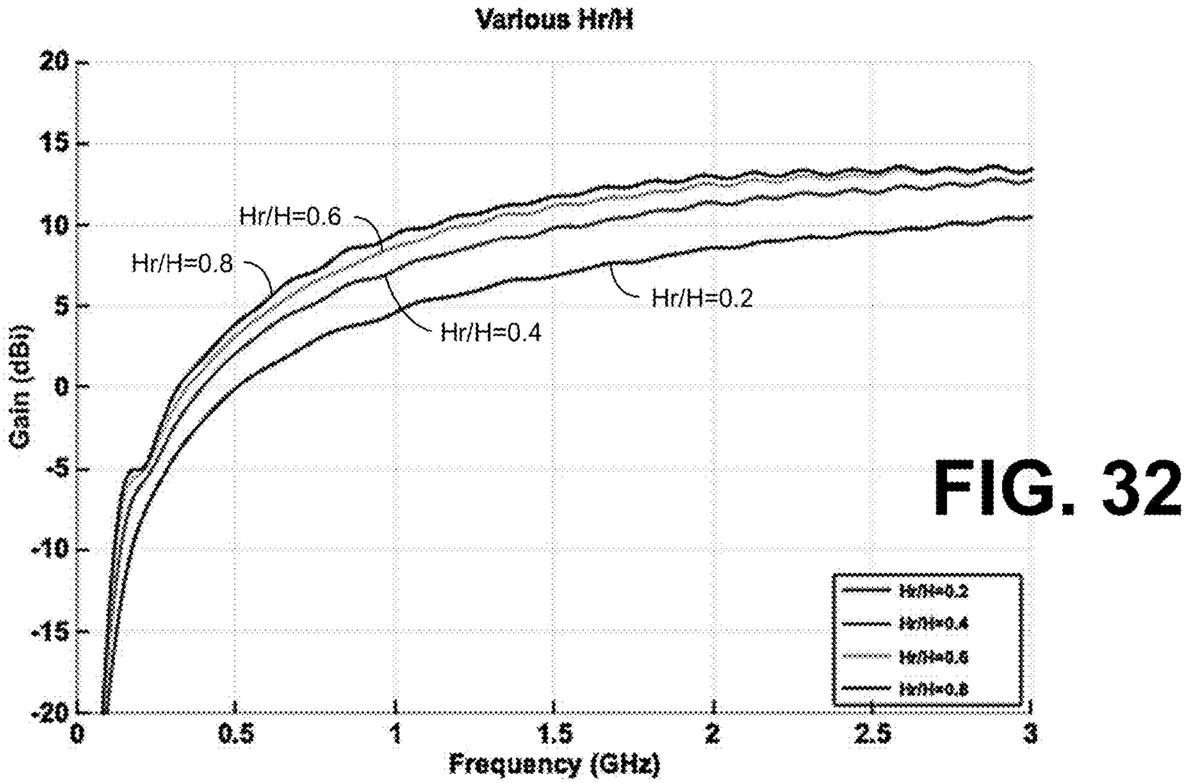
FIGS. 32-41 illustrate examples of the effects of Rcard transition height, termination value, gap and dielectric constant on a flat lens antenna design, in accordance with various embodiments of the present disclosure.

Fixing all the other parameters (e.g., L, H, W, Hg, dielectric constants, Rcard values, lens size and shape, etc.), the trade-off between antenna Rcard relative transition height, Hr/H, and antenna gain & front/back ratio can be obtained using CEM models of the antenna. FIG. 32 shows the forward gain, G, as a function of frequency for four values of Hr/H. The later the transition from metal to Rcard (larger Hr/H), the larger the forward gain. This is due to less loss in the resistive termination.

Figure 33:
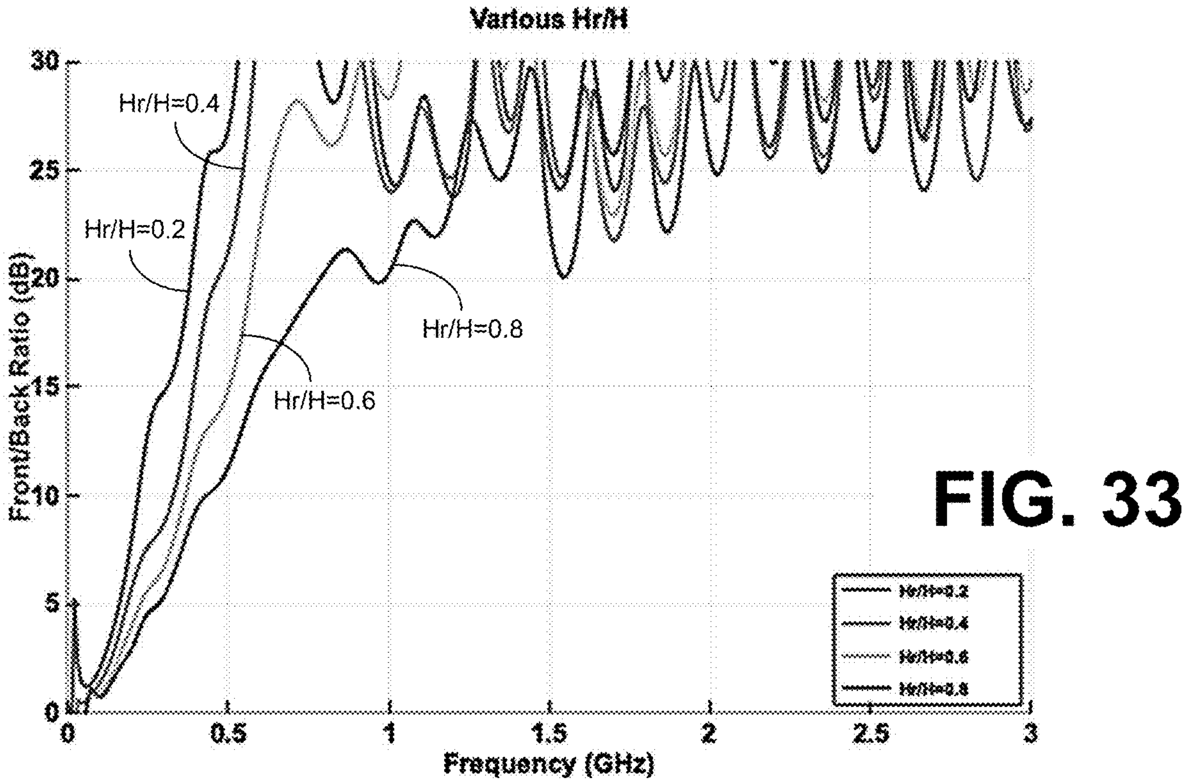

However, FIG. 33 shows a degradation in the front/back ratio as the transition height is increased. Thus, one must choose a happy medium, and in practice it was found that Hr/H=about 0.6 was a sweet spot. Of course, this trade-off is also impacted by the other variables that are held fixed in FIGS. 32 and 33.

TEM Antenna Arms Ends

Figure 62:
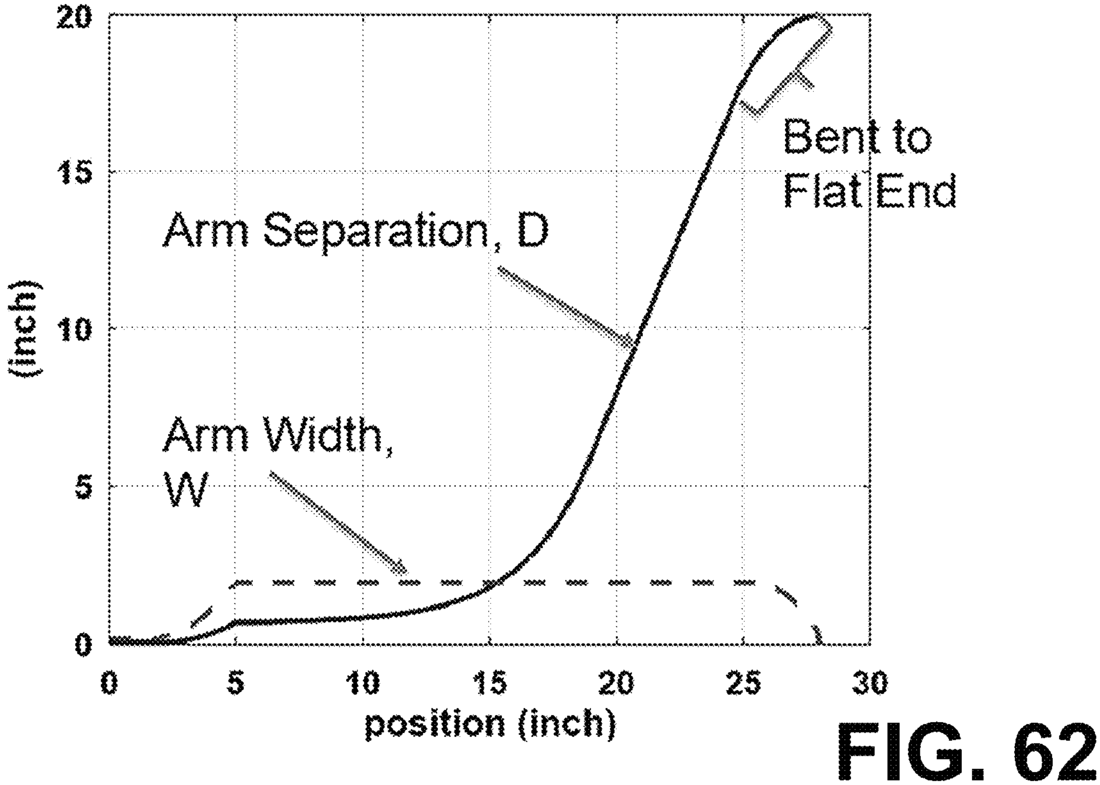

In another embodiment, the antenna arm ends can be exponentially tapered to flat as shown in FIG. 62. By tapering the antenna arm to flat, the termination resistive cards length reduction of the height of the conducting portion of arm is lessened resulting in antennas with higher gain.

Antenna Rcard Value

Figure 34:
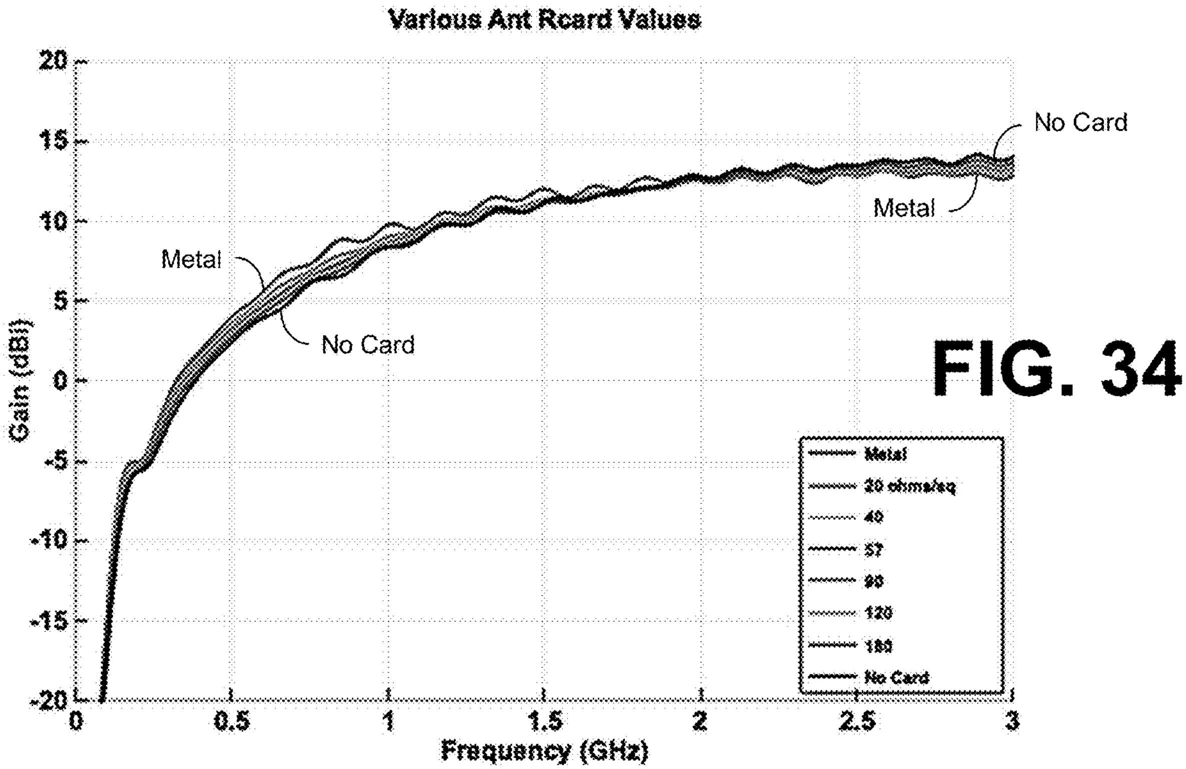
Figure 35:
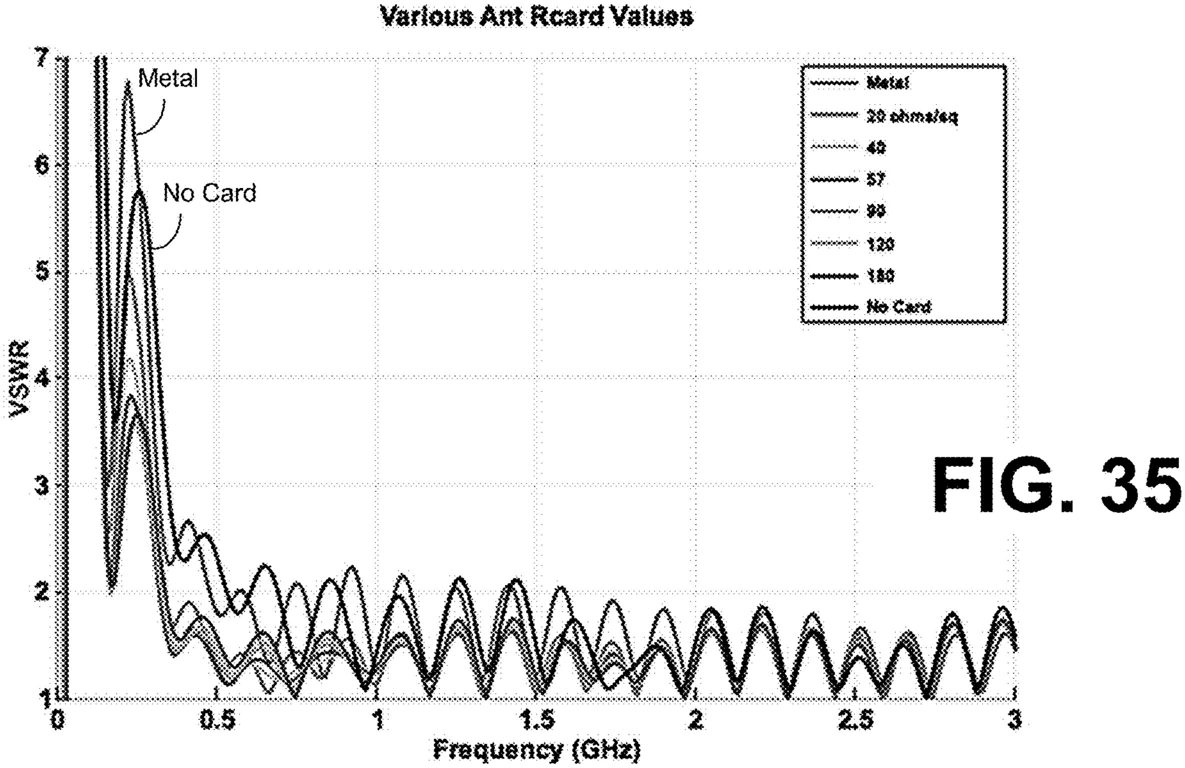

Fixing all the other parameters (e.g., L, H, W, Hr/H, Hg, dielectric constants, back Rcard value, lens size and shape, etc.), the trade-off between antenna-Rcard values on antenna gain & VSWR is obtained using CEM models of the antenna. FIG. 34 shows the forward gain, G, as a function of frequency for 8 termination cases that span from a metal to no Rcard. While the lower resistance values have slightly higher gain, the sensitivity is not great FIG. 35 shows the VSWR as function of frequency for the 8 termination cases. First, note that a metal termination and no Rcard have a worse VSWR than any of the six resistive Rcard termination cases. The impact of resistance value is most evident near 240 MHz, where the VSWR rises to well above 3. The higher resistances lower the peak from about 6 down to about 3.5.

As a rule of thumb, because of the tight grouping of the resistive curves, it was found that resistive cards from 50-150 ohms per square are adequate.

Back Rcard Value

Figure 36:
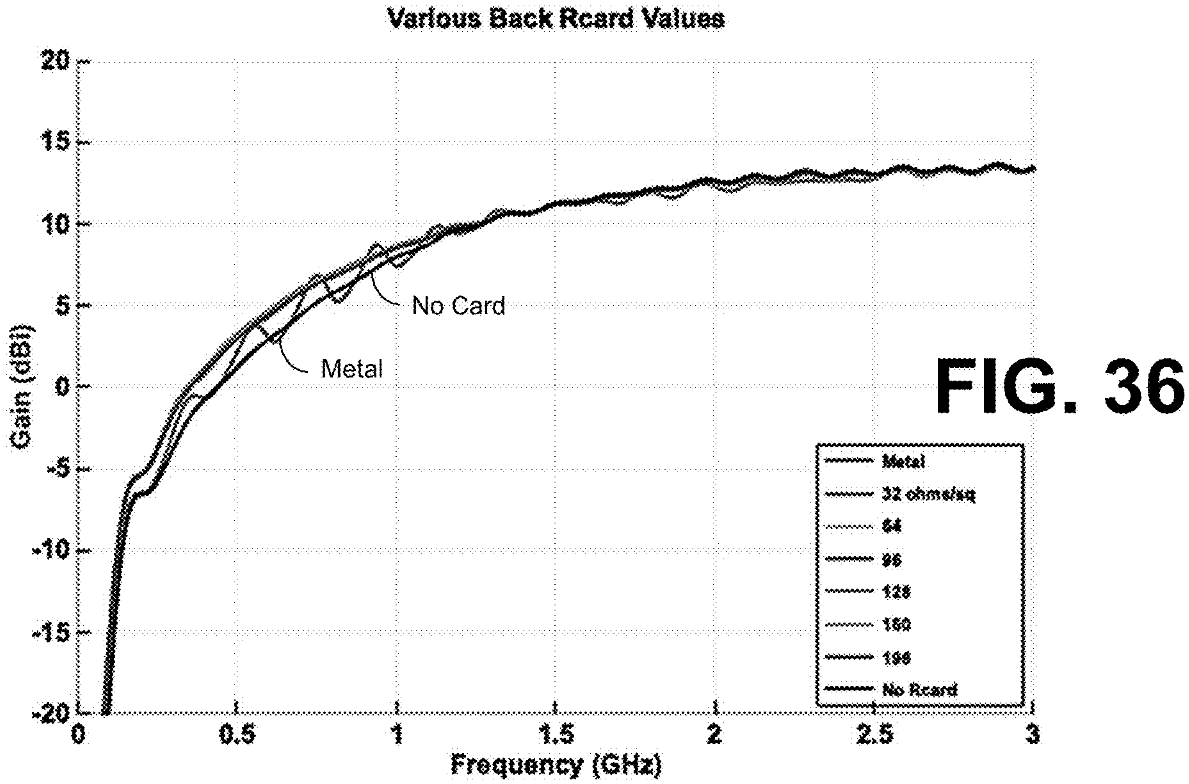

Fixing all the other parameters (e.g., L, H, W, Hr/H, Hg, dielectric constants, antenna Rcard value, lens size and shape, etc.), the trade-off between back-Rcard antenna gain & front-back ratio is obtained using CEM models of the antenna. FIG. 36 shows the forward gain, G, as a function of frequency for 6 values of resistive card. Notice that the forward gain is little impacted by the choice of back Rcard value. FIG. 36 also shows the results for no-Rcard and a metal sheet, both of these cases are worse than all 6 resistive card values.

Figure 37:
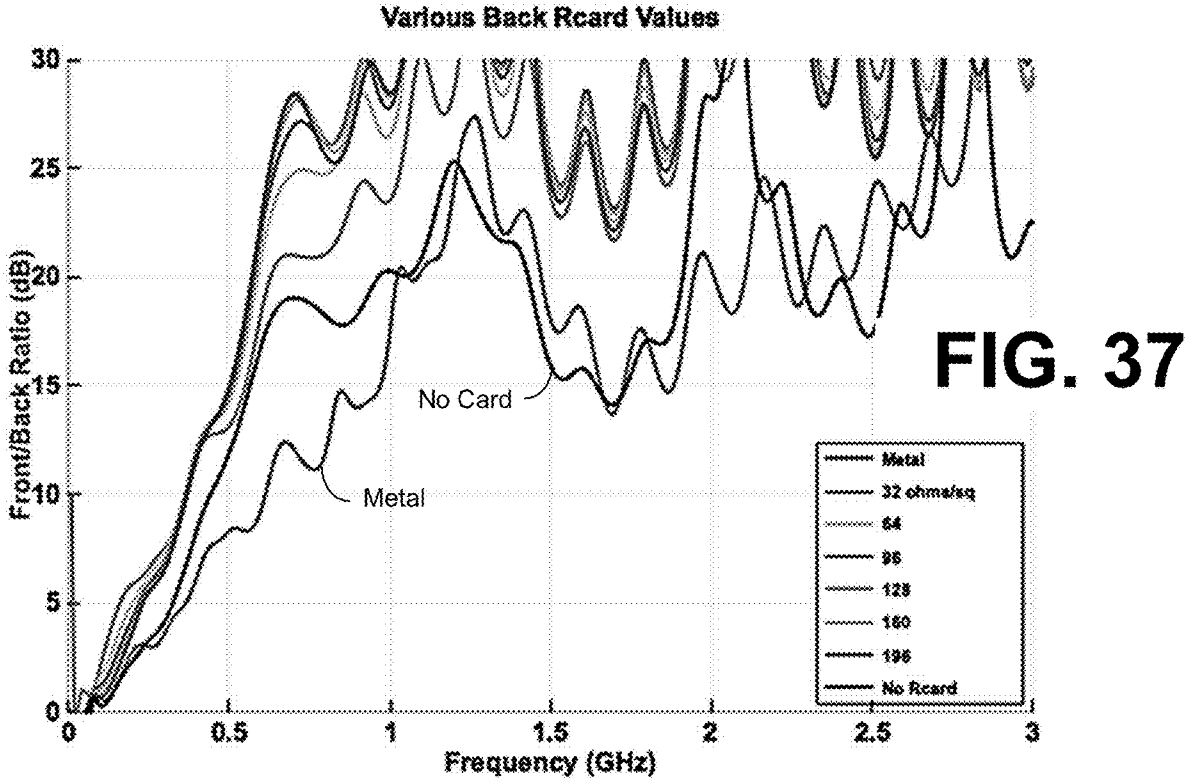

However, as FIG. 37 shows, the value of the back Rcard does impact the desired front/back ratio. The front/back ratio at the lowest frequencies is best for the lowest, 32 ohms/sq, case.

As a rule of thumb, one needs to carefully choose the back Rcard value along with the back Rcard gap value as discussed in the next section.

Antenna Back Rcard Gap

Fixing all the other parameters (e.g., L, H, W, Hr/H, dielectric constants, Rcard values, lens size and shape, etc.) the trade-off between back-Rcard gap, Hg, and antenna gain & front-back ratio is obtained using CEM models of the antenna.

Figure 38:
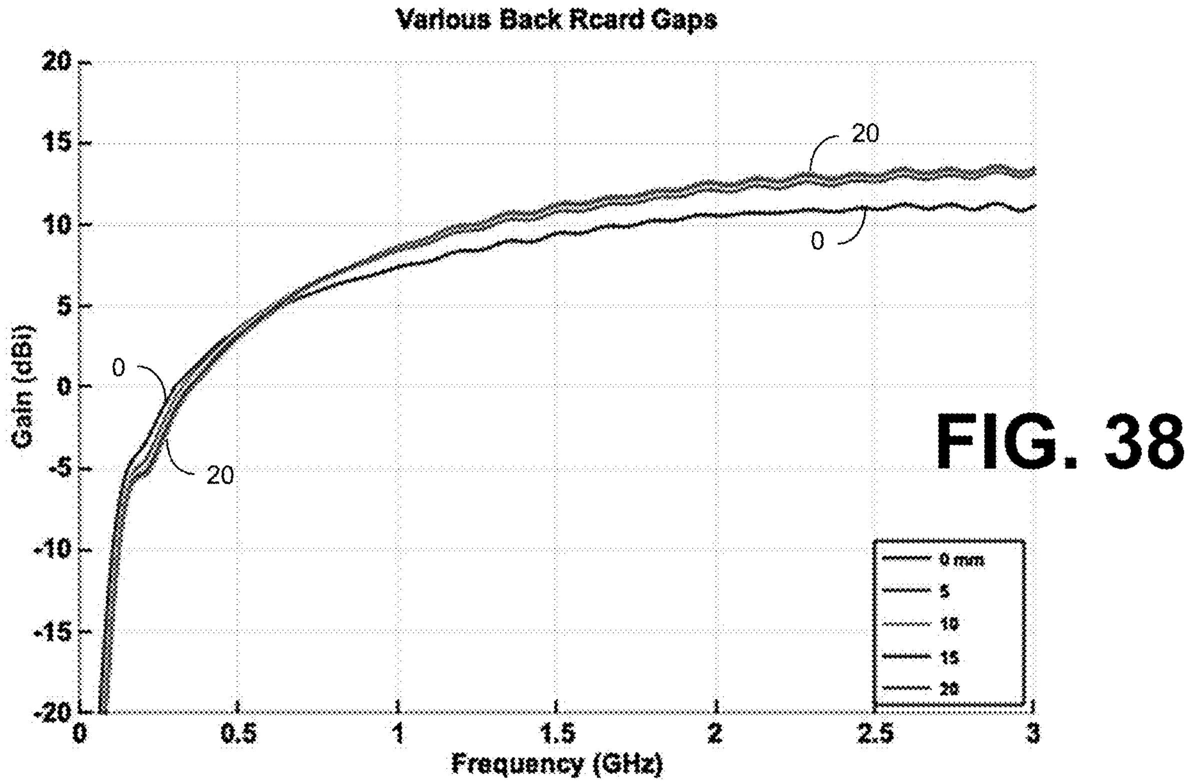

FIG. 38 shows the forward gain, G, as a function of frequency for 5 values of gap size. Notice that with no gap (Hg=0), the gain above about 600 MHz is progressively degraded by up to about 3 dB. This is because with no gap, the radiating fields are being attenuated strongly by the back Rcard. Further notice, that introducing a small gap of 5-20 mm, removes this upper band attenuation.

Figure 39:
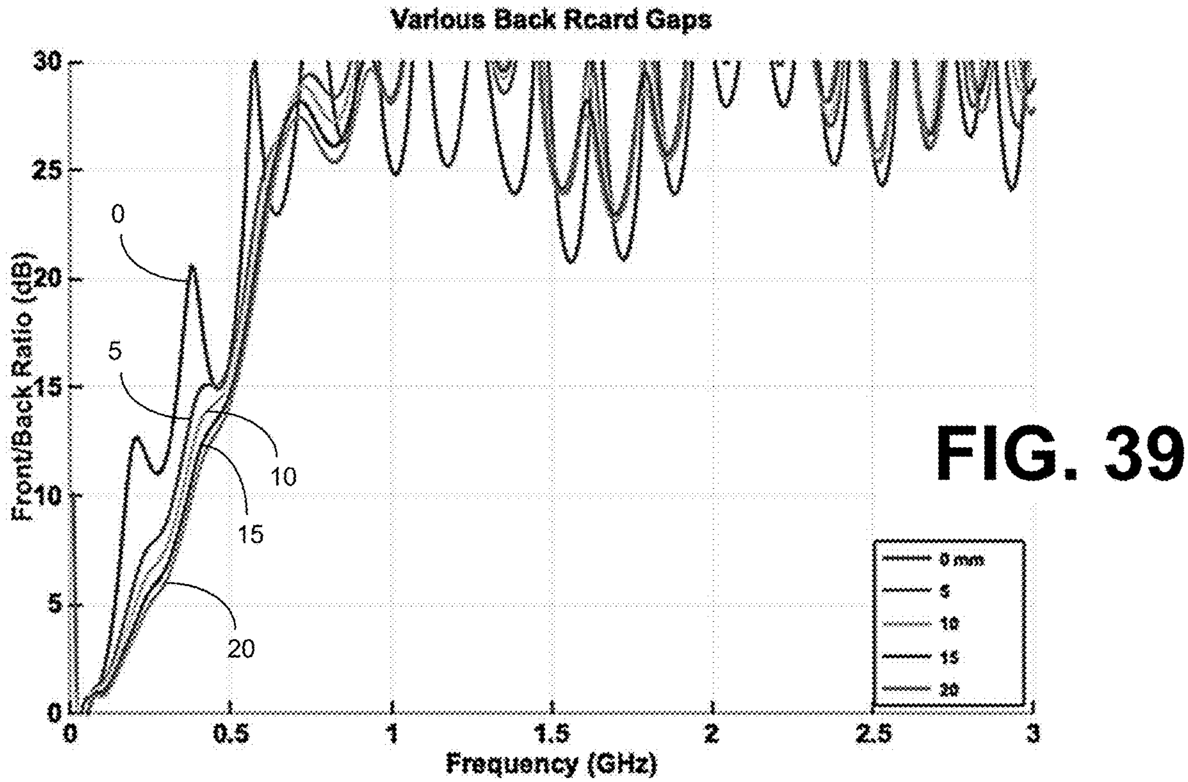

FIG. 39 shows the front/back ratio as a function of frequency for the same 5 values of gap size. Notice that the no gap case (Hg=0) has improved front/back ratio from 200-500 MHz.

As a rule of thumb, one needs to carefully choose the back Rcard gap size and ensure that when fabricated that the gap size matches the model value.

Antenna Back Rcard Shape

Figure 63:
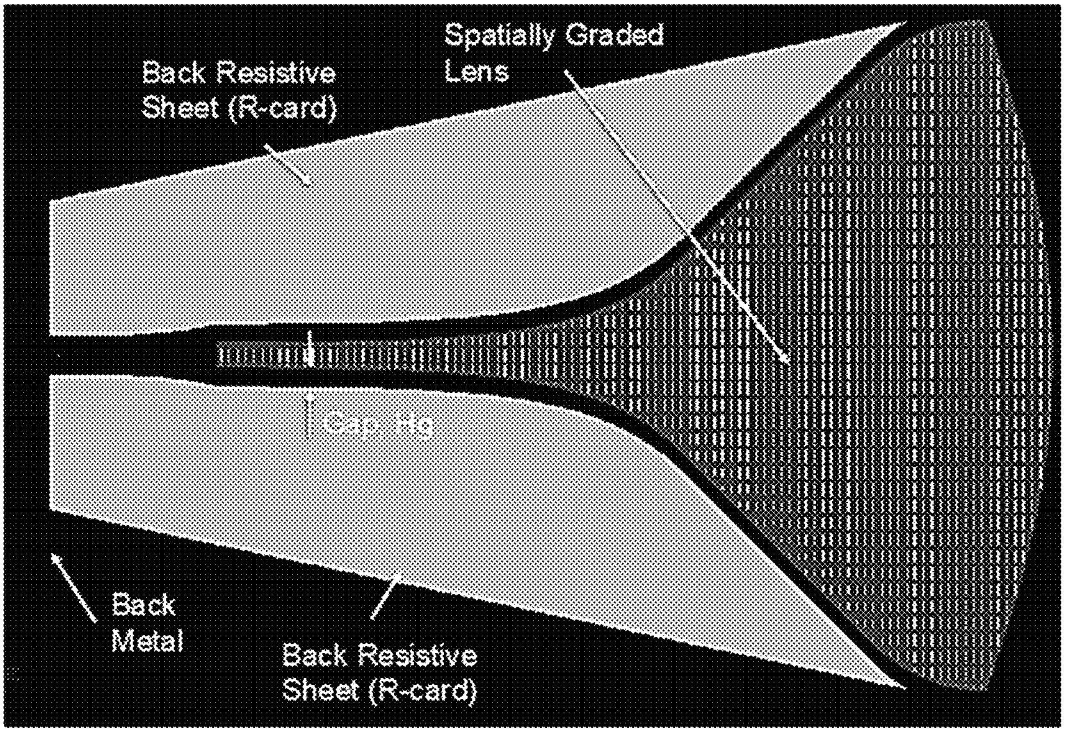
FIG. 63 illustrates an example of an antenna back Rcard shape, in accordance with various embodiments of the present disclosure.

In addition to the gap, Hg, it is advantageous to shape the back end of the Rcard as shown FIG. 63. Computational electromagnetic (CEM) simulations show that the back-traveling wave is strongly attached to the top edge of this resistive card. By changing the angle of the top edge as shown in FIG. 63, the back-traveling can be focused into the metal backing on the antenna which reduces leads to a reduction in the back lobe of the antenna gain.

Antenna Back Dielectric Constant

Fixing all the other parameters (e.g., L, H, W, Hr/H, Hg, throat and lens dielectric constants, Rcard values, lens size and shape, etc.), the trade-off between antenna back dielectric constant, $\varepsilon_B$, and antenna gain & front-back ratio is obtained using CEM models of the antenna.

As the dielectric constant of the "antenna back" material is raised above the epsilon of foam (e.g., 1.25), the material is realized as using the man-made anisotropic dielectric constant approach discussed earlier, with a the tensor component parallel to the desired polarization being the higher value with the other two being low.

Figure 40:
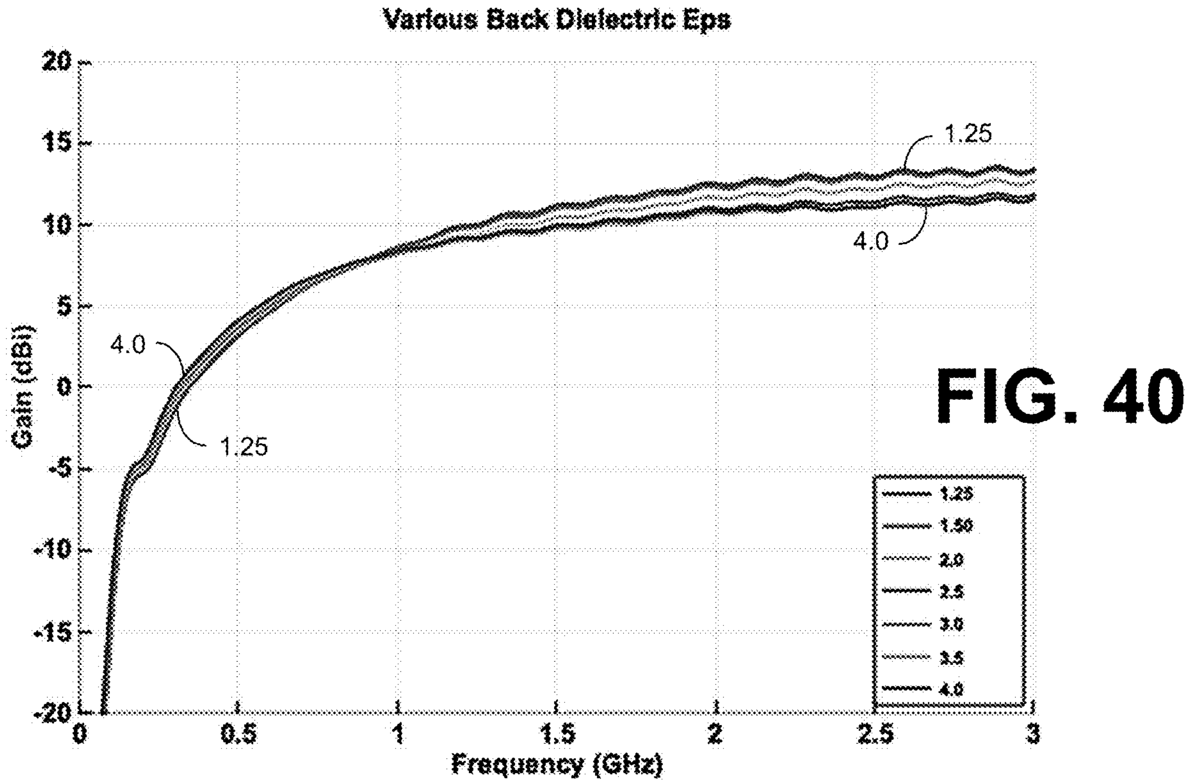
Figure 41:
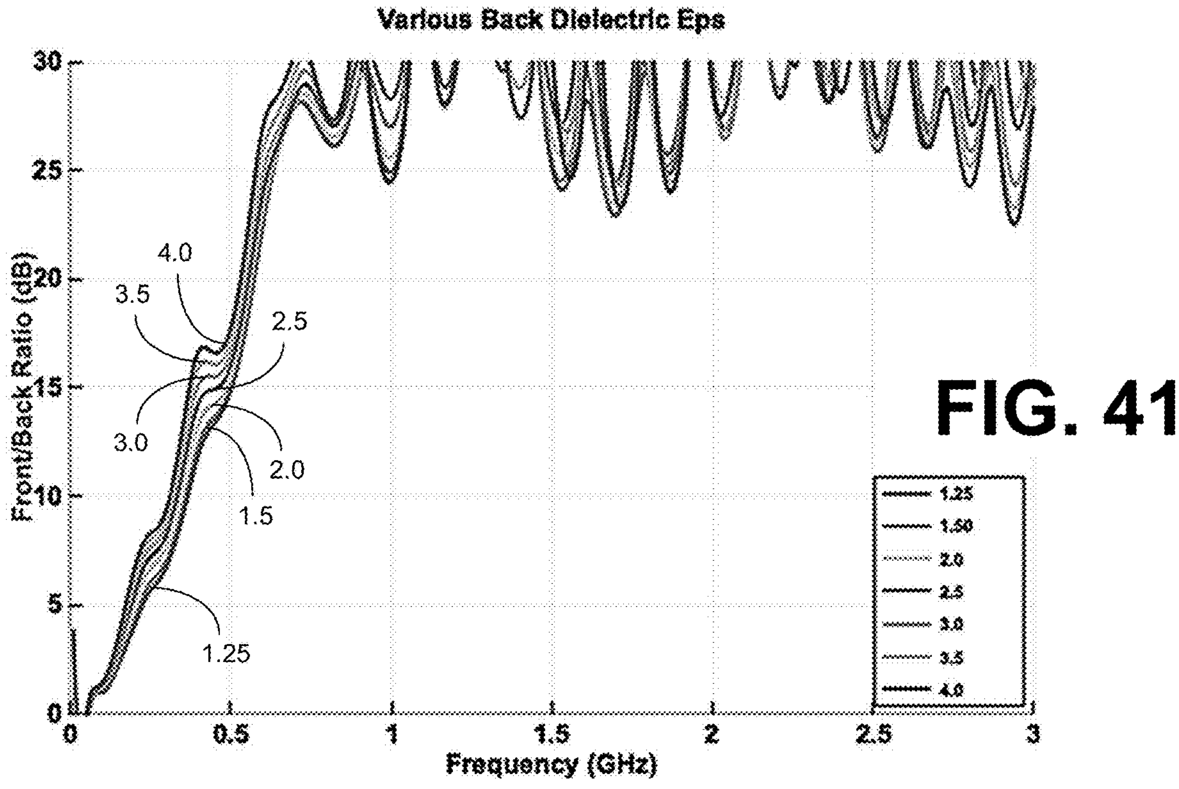

FIG. 40 shows that above about 900 MHz the gain is degraded as the dielectric constant increases while below about 900 MHz the gain is enhanced. FIG. 41 shows that the front-back ratio is improved with increasing back dielectric constant.

As a rule of thumb, for best performance below about 900 MHz, one should use anisotropic dielectric materials in the "antenna back" region.

Antenna Back Metamaterial

Figure 64:
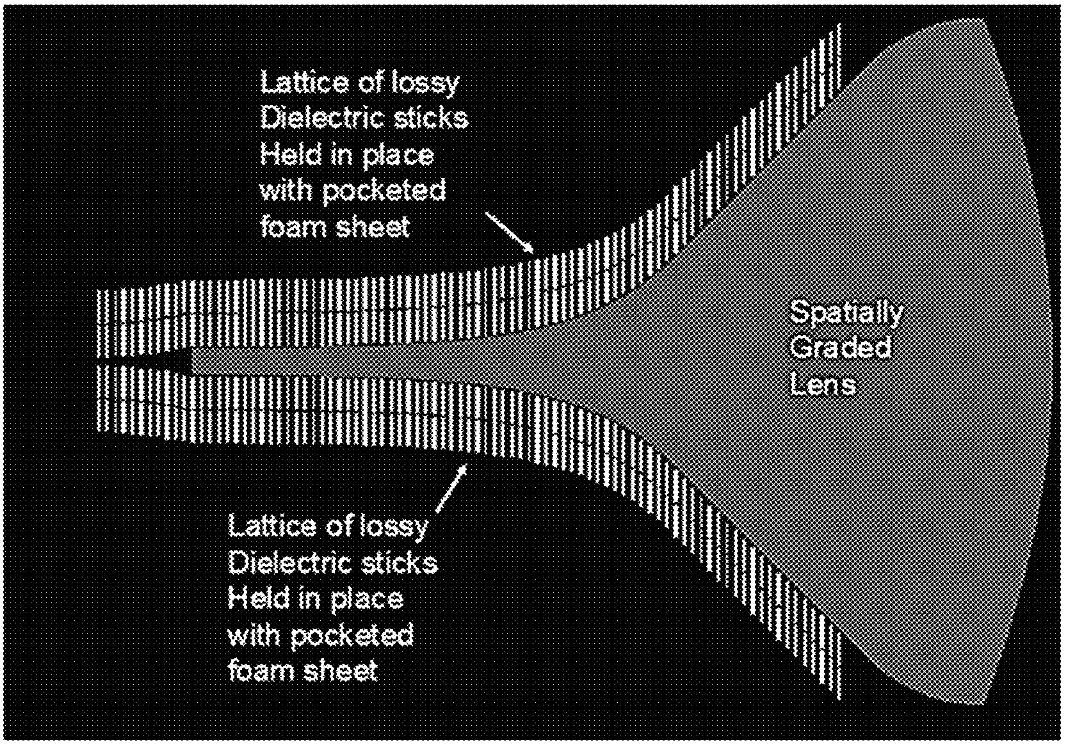
FIG. 64 illustrates an example of an antenna back metamaterial, in accordance with various embodiments of the present disclosure.

In another embodiment, shown in FIG. 64, the anisotropic back-dielectric properties can be formed by including a lattice of lossy dielectric sticks. This lattice of sticks form a meta-material. The meta-material properties can be designed using computational electromagnetic (CEM) codes. Since the front/back ratio is typically worse at the lower frequencies, the back-metamaterial can be designed to have the most loss at the lower octaves of the band of operation to improve the front/back ratio (or in other words reduce the back-lobes of the antenna).

Antenna Throat Dielectric Constant

Fixing all the other parameters (e.g., L, H, W, Hr/H, Hg, back and lens dielectric constants, Rcard values, lens size and shape, etc.), the trade-off between antenna throat dielectric constant, $\varepsilon_T$, and antenna gain & VSWR was obtained using CEM models of the antenna.

Figure 42:
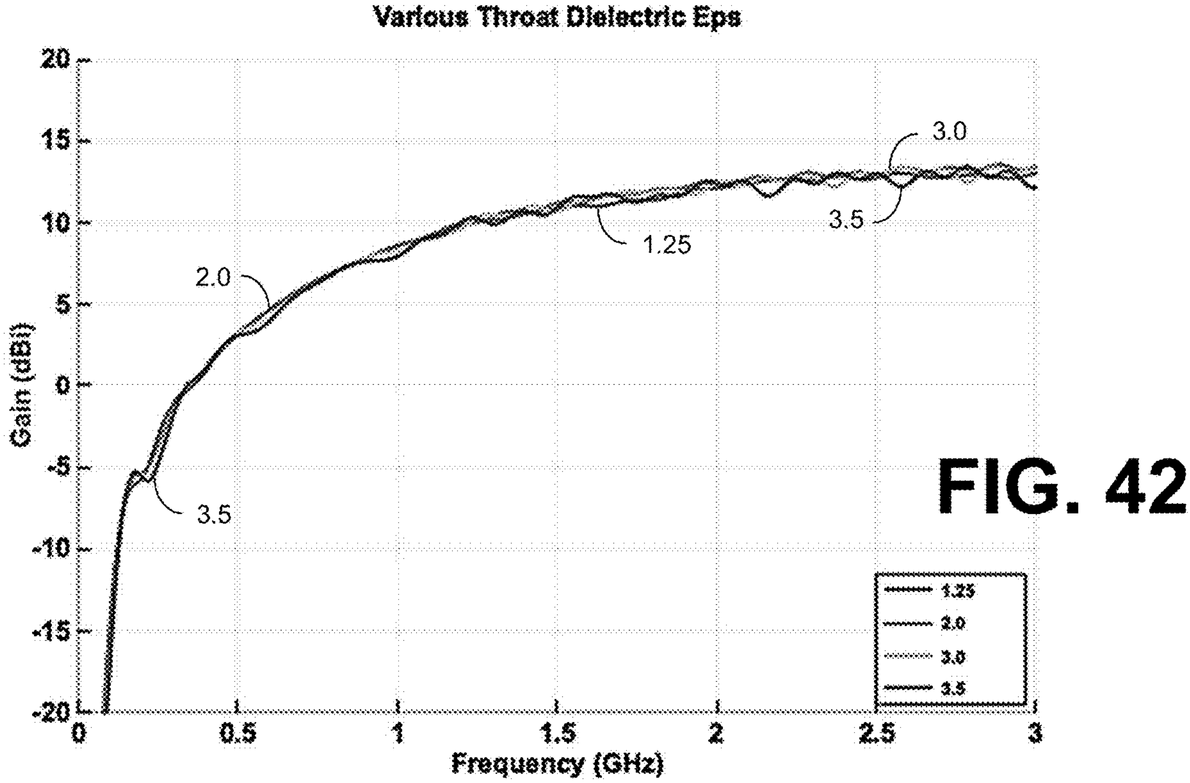
FIGS. 42 and 43 illustrate examples of the effects of the antenna throat dielectric constant on a flat lens antenna design, in accordance with various embodiments of the present disclosure.

FIG. 42 shows forward antenna gain, G, as a function of frequency for four values of throat dielectric constant, $\varepsilon_T$. The impact is minor.

Figure 43:
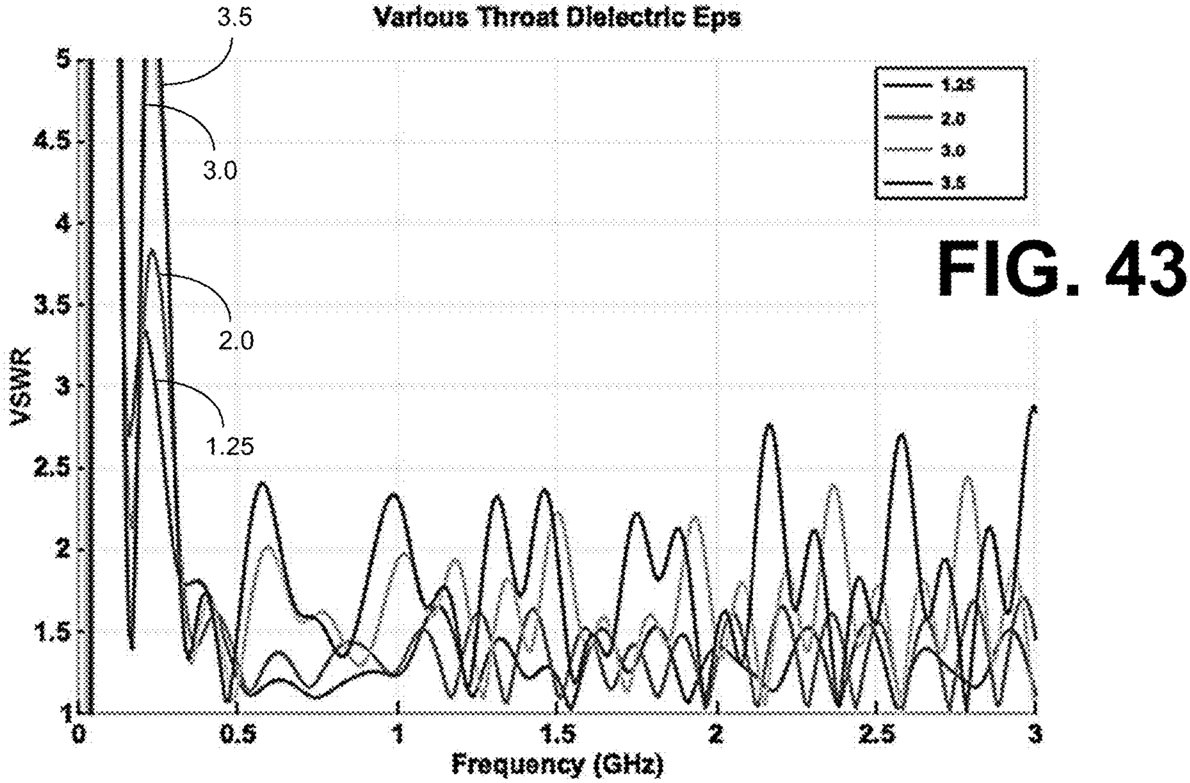

FIG. 43 shows the VSWR for the same four values. The trend is clear, the lowest dielectric (1.25) has the best VSWR.

As a rule of thumb, because of the small spacing between the antenna conductors in the throat region, from a fabrication view point, it is better to use a low loss, low epsilon material such as a plastic (Eps about 2.0) which performs nearly as well as foam (Eps about 1.25).

Antenna Lens Shape

Figure 44:
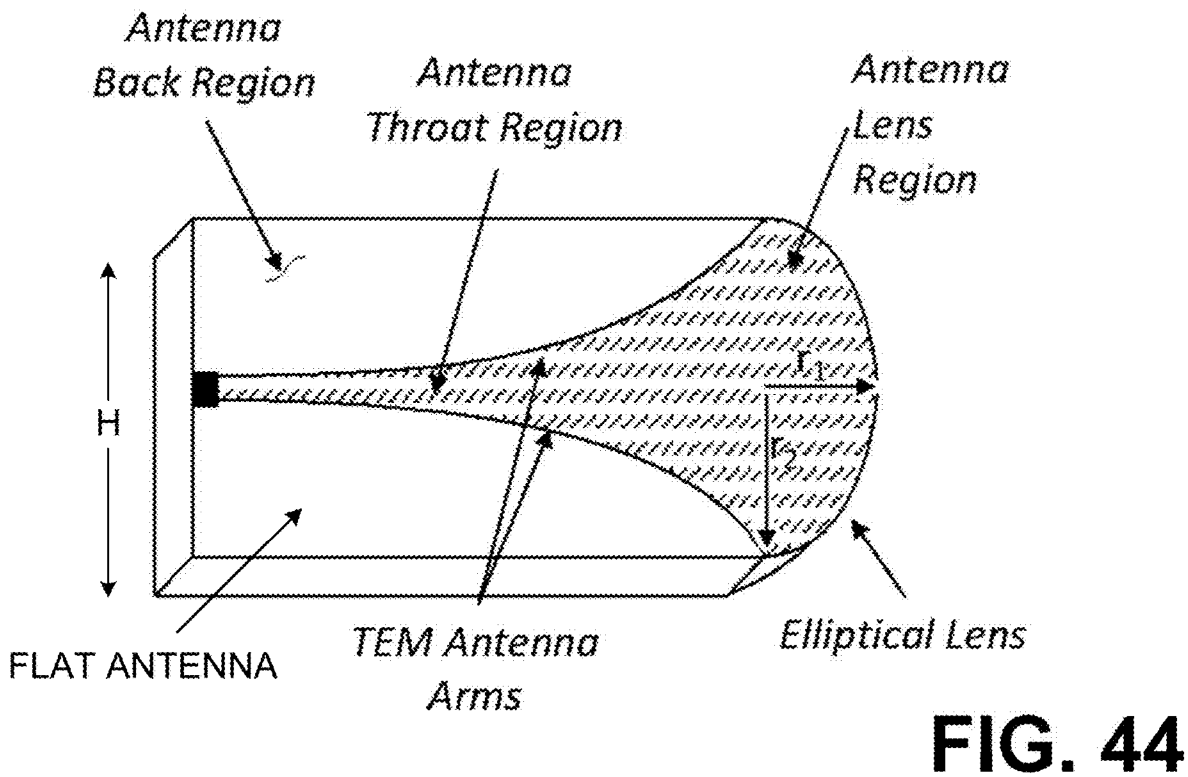
FIGS. 44-46 illustrates examples of lens shapes for a flat lens antenna design, in accordance with various embodiments of the present disclosure.

The results presented above were based on an elliptical lens shape. As shown in FIG. 44, the profile/shape of the output/radiating surface of the FLAT antenna is an ellipse defined by its two radii of curvature, $r_1$ and $r_2$. The radius $r_2$ is set by the height of the antenna; $r_2=H/2$. Fixing all the other parameters, the radius $r_1$ is varied until the gain of the antenna is maximized.

Figure 45:
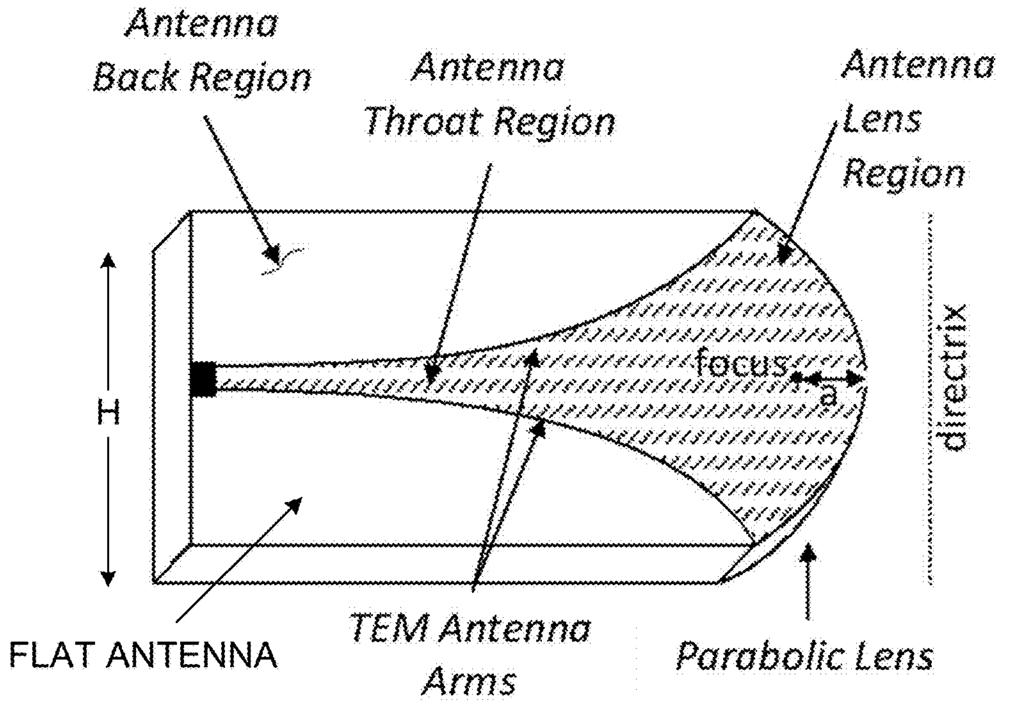

Other embodiments have different antenna lens shapes. A parabolic lens shape embodiment is shown in FIG. 45. The parabolic shape is a function of the distance 'a' from the vertex, V, to the focus. The parabolic shape is positioned such that the parabolic shape matches the height, H, of the antenna. Fixing all the other parameters, the distance a is varied until the gain of the antenna is maximized.

Figure 46:
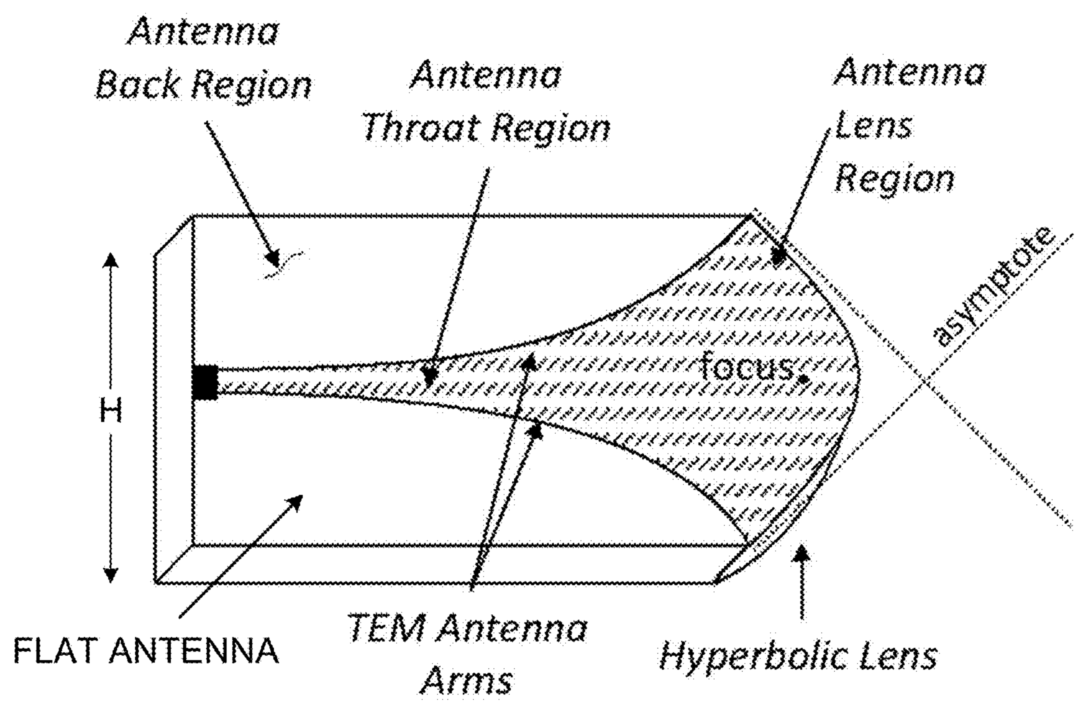

A hyperbolic lens shape embodiment is shown in FIG. 46. The hyperbolic shape is a function of the angle between its asymptotes and the distance to the focus. The hyperbolic shape is positioned such that the hyperbolic shape matches the height, H, of the antenna. Fixing all the other parameters, the distance to the focus is varied until the gain of the antenna is maximized.

Antenna Lens Dielectric Constant

Fixing all the other parameters (e.g., L, H, W, Hr/H, Hg, back and throat dielectric constants, Rcard values, lens size and shape, etc.), the trade-off between antenna lens dielectric constant, $\varepsilon_L$, and antenna gain, VSWR and front-back ratio was obtained using CEM models of the antenna.

Figure 47:
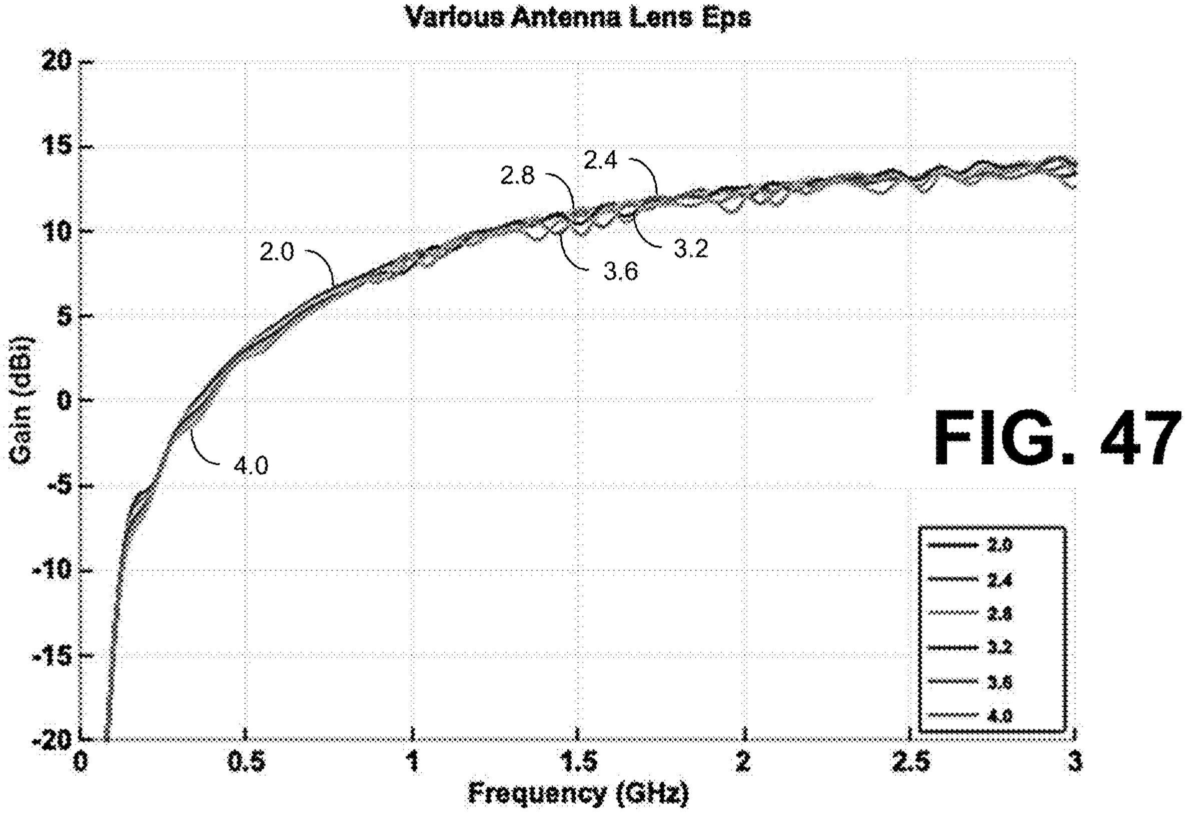
FIGS. 47-49 illustrate examples of the effects of the antenna lens dielectric constant on a flat lens antenna design, in accordance with various embodiments of the present disclosure.

FIG. 47 shows forward antenna gain, G, as a function of frequency for six values of lens dielectric constant, $\varepsilon_L$, in the large tensor direction. As the dielectric constant increase, the 200-500 MHz gain is decreased, and from 1-3 GHz ripples are evident.

Figure 48:
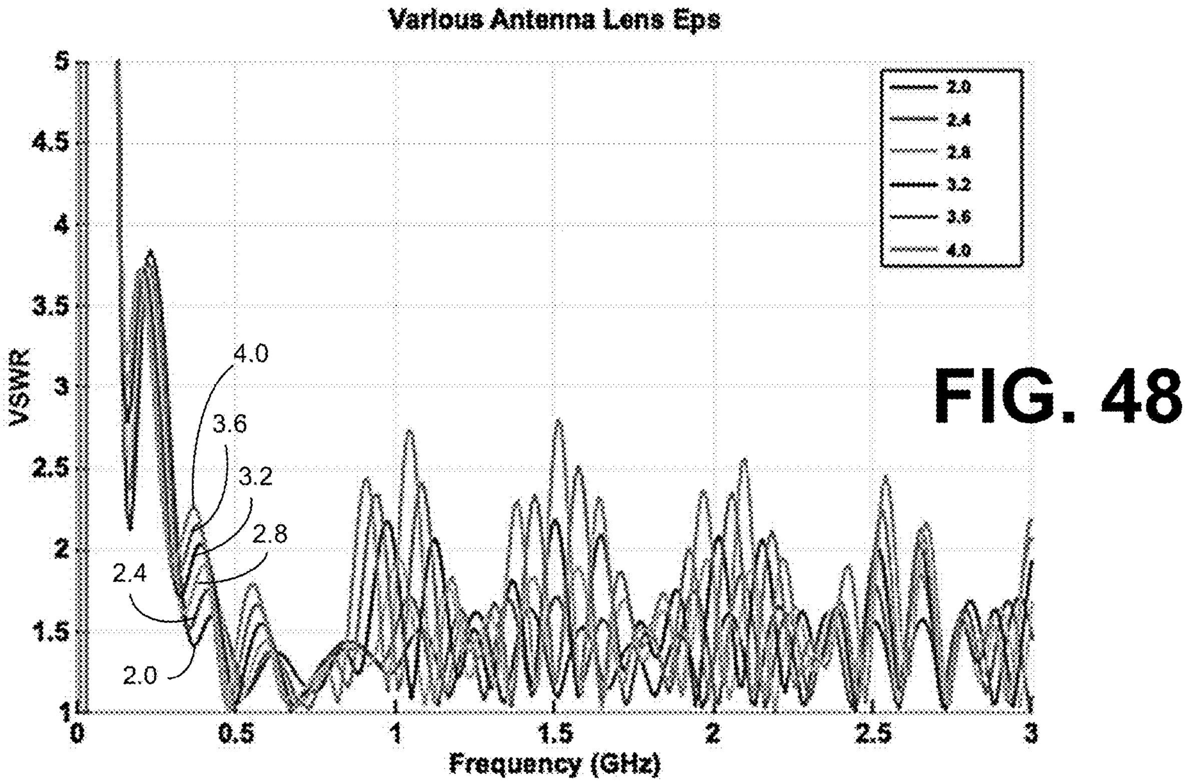

FIG. 48 shows the VSWR for the same six values. The 1-3 GHz gain ripples are also evident in the increased VSWR from 1-3 GHz.

Figure 49:
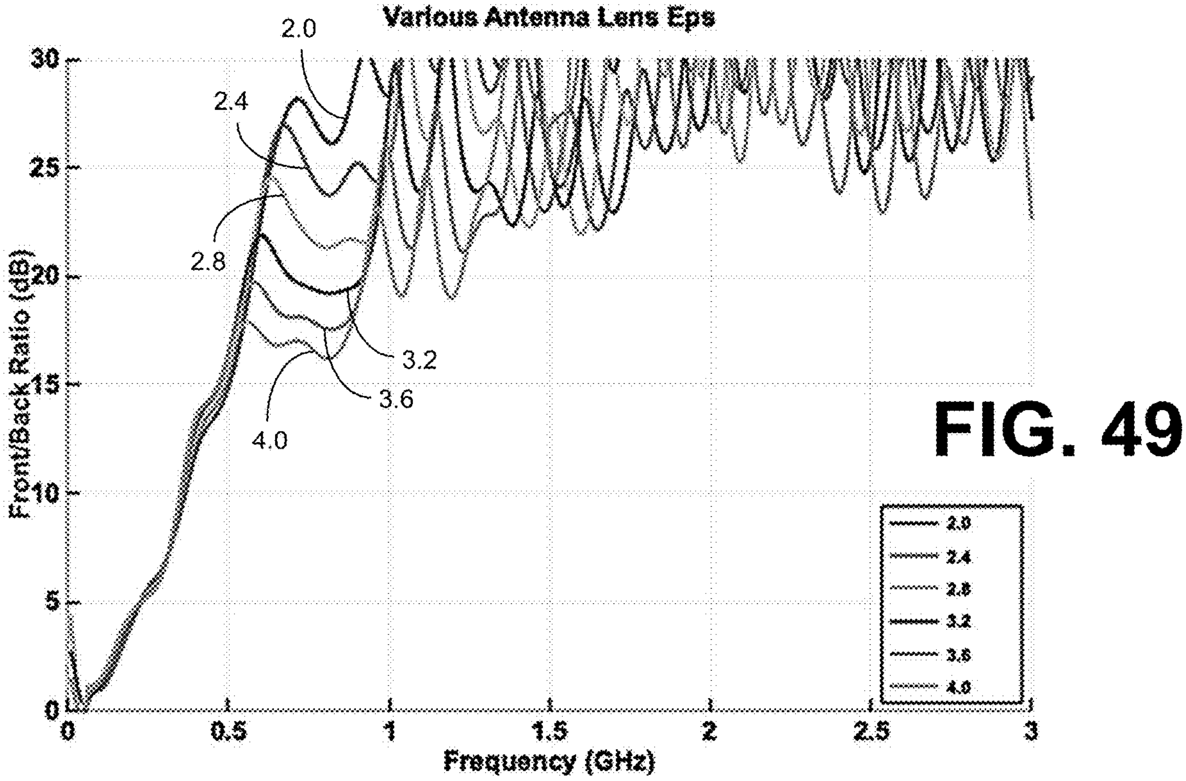

FIG. 49 shows the front-back ratio for the same six values. The impact on 200-500 MHz Front-Back ratio is not strong.

As the dielectric constant of the "antenna lens" region is increased, the mismatch at the lens output surface increases causing the antenna performance to suffer.

Spatially Graded Lens

One advantage of using man-made, anisotropic dielectric materials is that the dielectric constant can be spatially graded within the "antenna lens" region to further improve the antenna performance.

The embodiments discussed in this section and illustrated in FIGS. 50-53 show discrete changes in the dielectric constant in 3-5 steps. Recall, that one approach to realizing the anisotropic dielectric is to use a lattice of embedded conducting sticks in a foam host (see FIG. 5). Further recall, that using computational electromagnetic codes and/or mixing theories, the relationship between stick length and dielectric constant can be determined (e.g., see FIG. 6). Thus, in practice the dielectric constant can be changed more gradually by adjusting the individual lengths of the conducting sticks in the man-made, anisotropic material.

Figure 50:
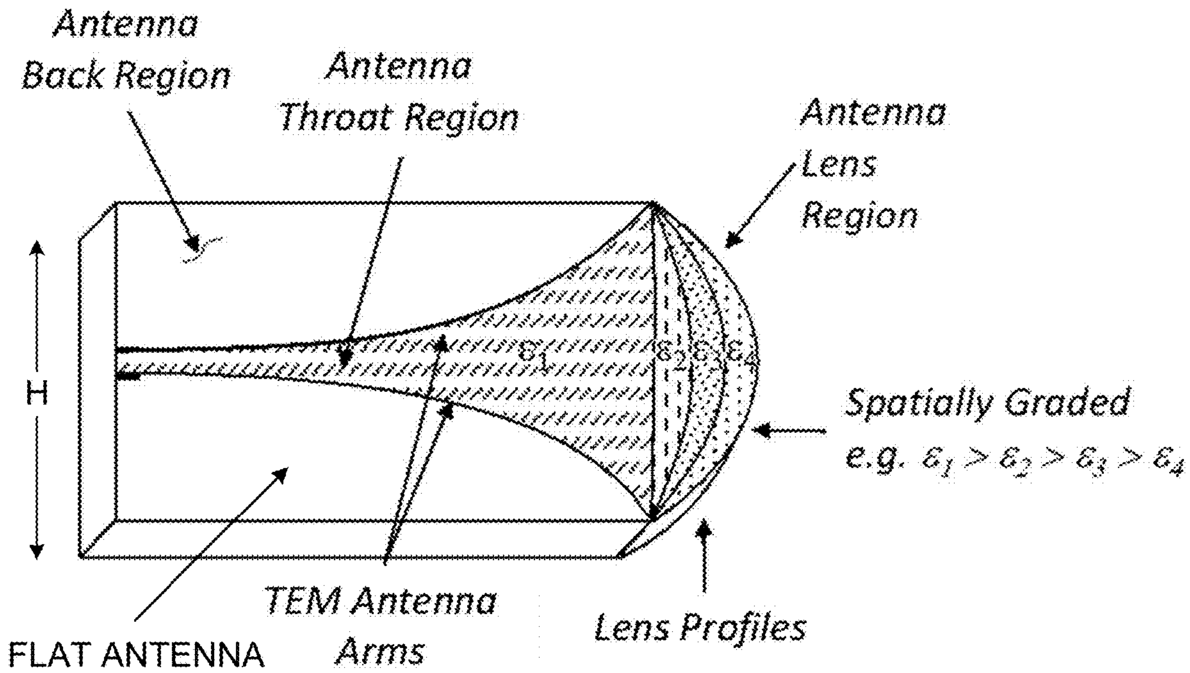
FIGS. 50-54 illustrate examples of spatially graded antenna lens on a flat lens antenna design, in accordance with various embodiments of the present disclosure.

One embodiment to decrease the impact from mismatch at the lens output surface is to decrease the dielectric constant in the length direction as shown in FIG. 50.

Figure 51:
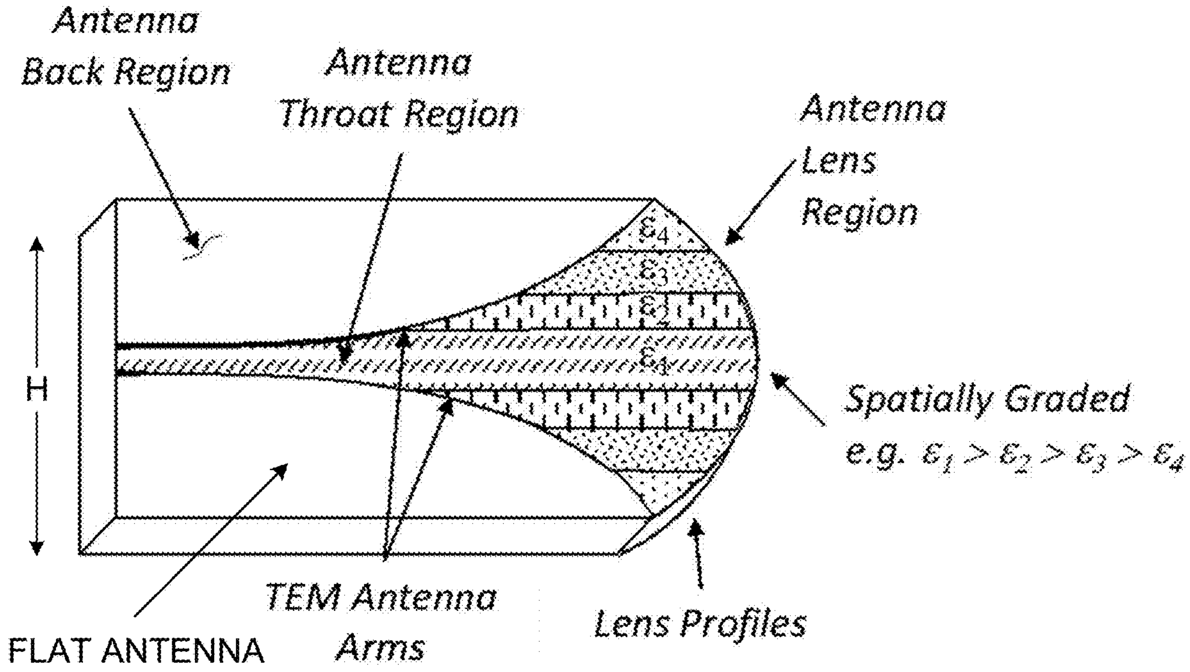

Another embodiment decreases the dielectric constant in the height direction as shown in FIG. 51. The dielectric constant can be decreased away from the center line of the antenna. This type of spatial grading also decreases the size of the lens profile which decreases the length, L, of the flat lens antenna.

Figure 52:
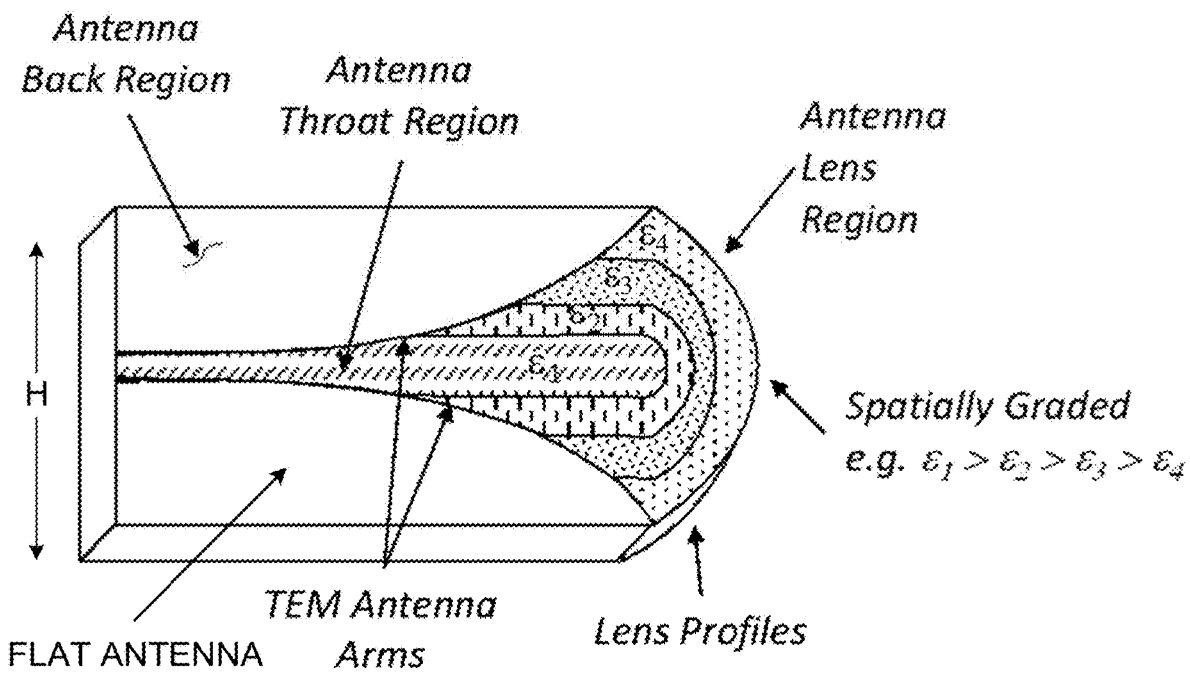

Another embodiment decreases the dielectric constant in both the height and length directions as shown in FIG. 52. This type of spatial grading both decreases the size of the lens profile and decreases the output/radiating surface mismatch.

Figure 53:
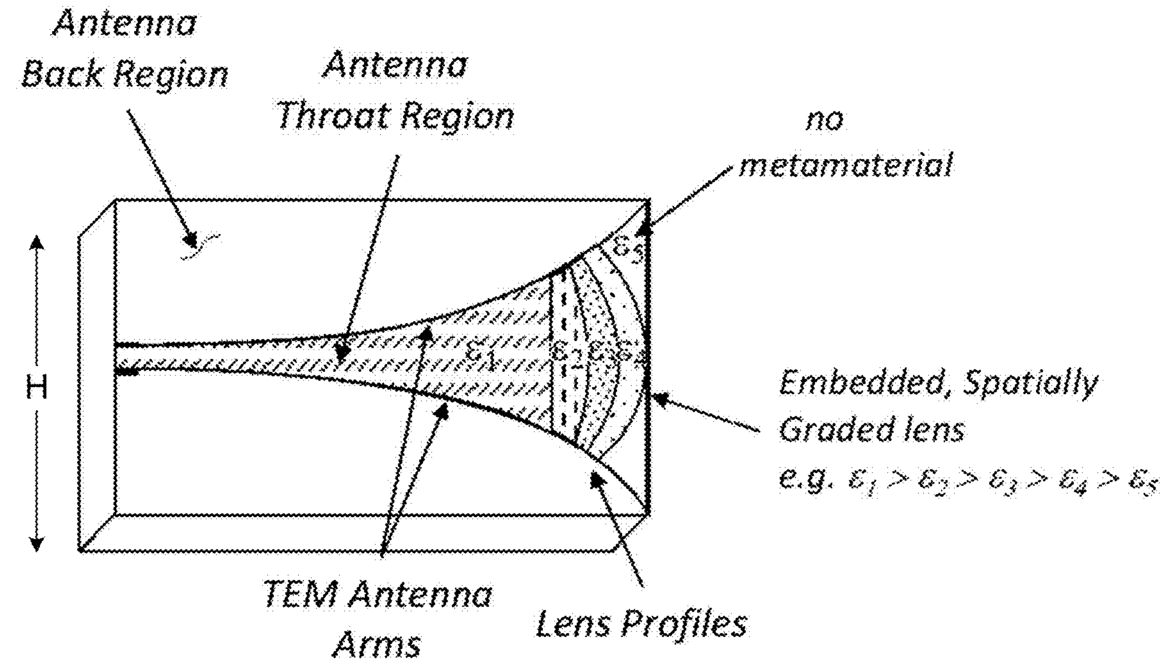

In another embodiment, the spatially graded lens can be embedded within the flat lens antenna as shown in FIG. 53. Again, the dielectric constant is decreased; i.e. $\varepsilon_1>\varepsilon_2>\varepsilon_3>\varepsilon_4>\varepsilon_5$. The material in the antenna corners (e.g., $\varepsilon_5$ in this drawing) can be unloaded dielectric host material.

Figure 54:
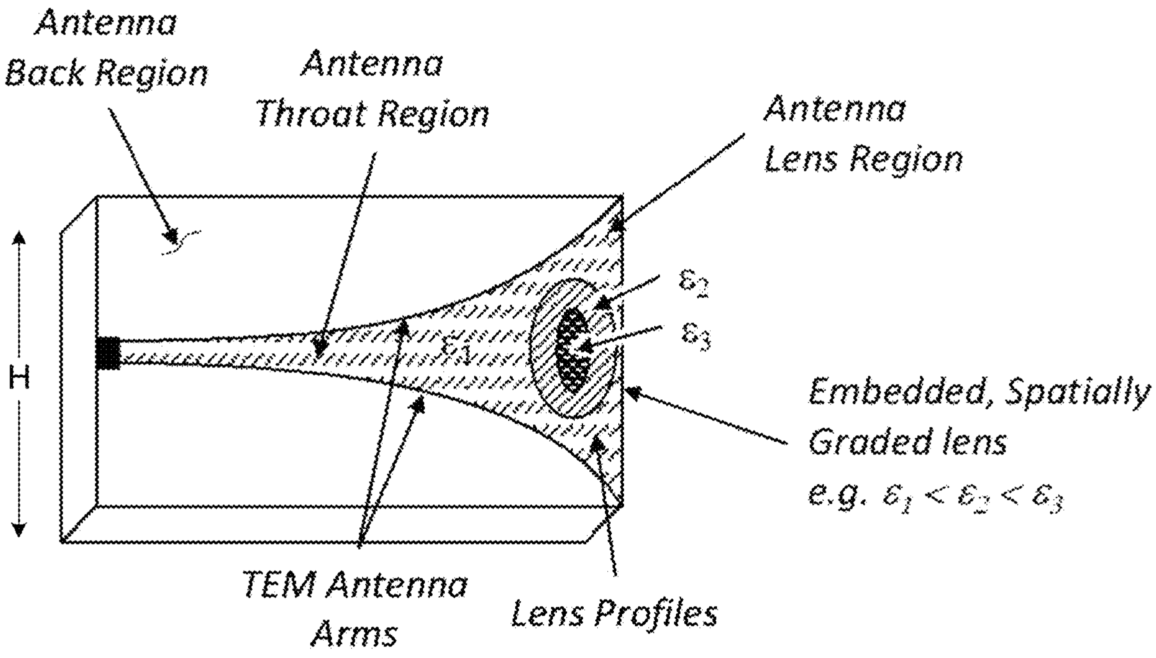

In another embodiment, the spatially graded lens can be embedded within the flat lens antenna as shown in FIG. 54. Now, the dielectric constant can be increased i.e. $\varepsilon_3>\varepsilon_2>\varepsilon_1$. This embodiment also leads to a decreased length of the flat lens antenna.

In the above spatially graded embodiments, using a computational electromagnetic code, the embedded lens profiles can be adjusted along with the dielectric constants to maximize performance (i.e. gain, F/B ratio, etc.) while reducing the radiating/output surface reflection.

Manufacturing Anisotropic Meta-Materials

Figure 55:
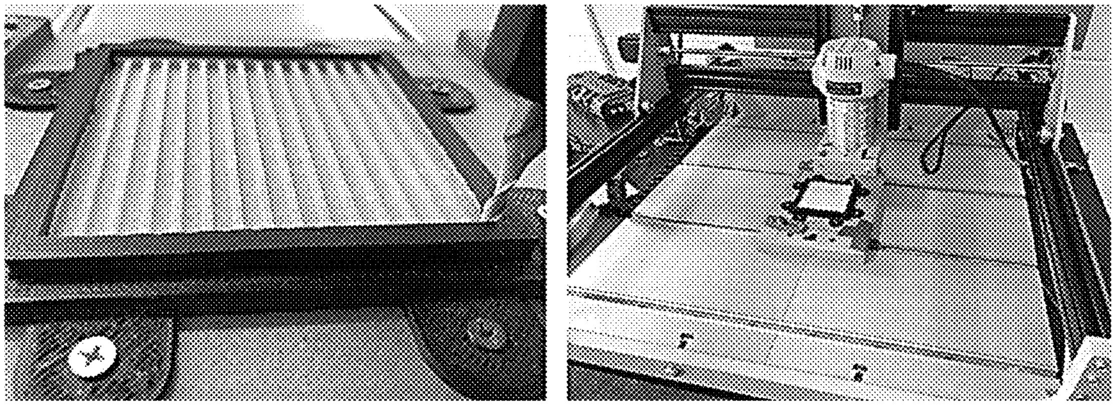
FIGS. 55-57 are images illustrating the fabrication of a low loss, anisotropic dielectric sample using metamaterial, in accordance with various embodiments of the present disclosure.
Figure 56:
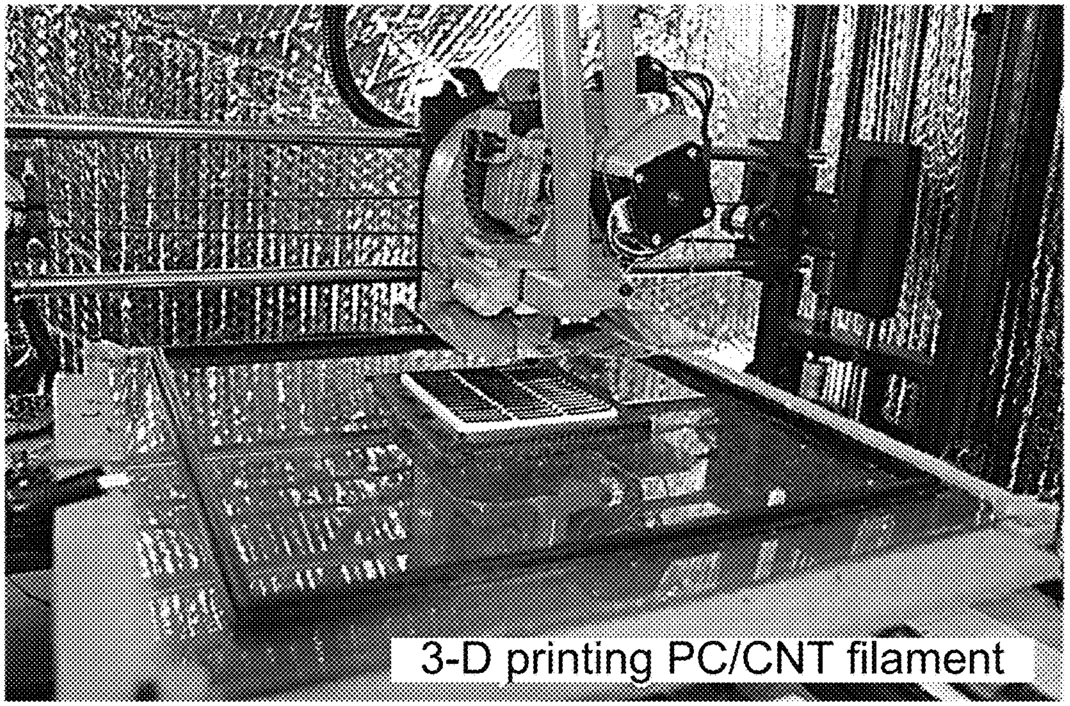
Figure 57:
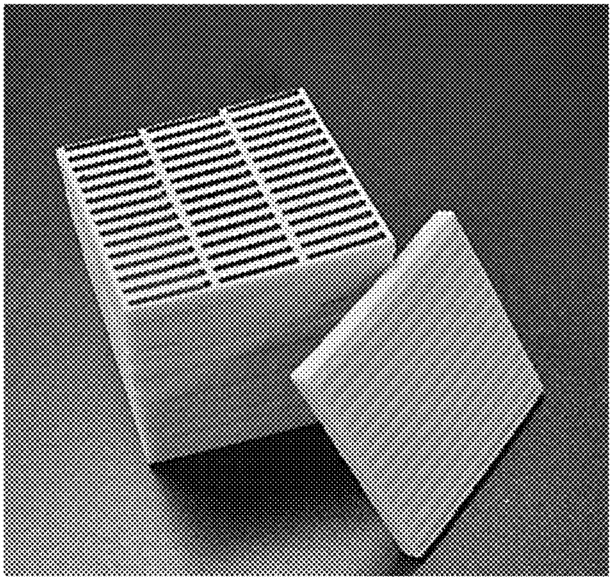

The disclosed approach to the metamaterial design can incorporate carbon-filled 'sticks' arranged onto ¼" thick foam layers. These materials were prototyped with 3" by 3" by ¼" foam "crackers" that were milled with grooves on one side. FIG. 55 shows images of the automated milling of grooves in the foam, and FIG. 56 shows an image of a 3-D printing with carbon-loaded filament on the other side. The grooves accommodate the thickness of the 3D printed lines so that the metamaterial can be assembled into a cohesive unit that is stiff while still being light weight. The assembly of the crackers fit together much like children's building blocks, which snap to a tight fit. As shown in the image of FIG. 57, the metamaterial sample is made up of multiple layers.

Figure 58:
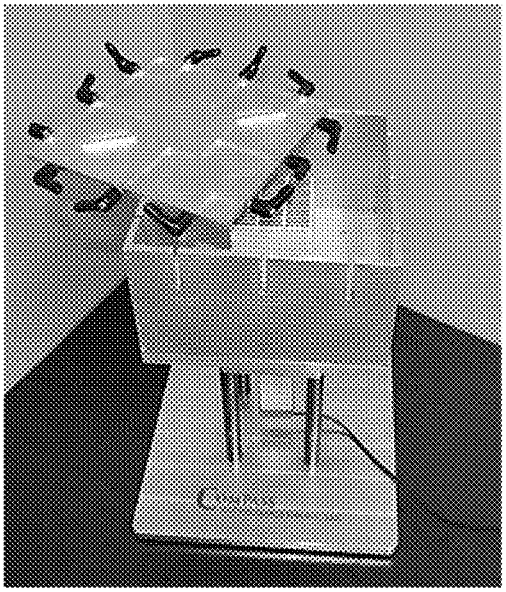
FIGS. 58 and 59 are images illustrating the use of an RF capacitor apparatus to measure characteristics of the loss, anisotropic dielectric samples in different orientations, in accordance with various embodiments of the present disclosure.

The anisotropic dielectric constant of the metamaterial sample cubes were then measured using an RF Capacitor apparatus, see FIG. 58. This RF Capacitor fixture is a commercially available device that CTG designed and manufactures. It provides a unique capability of broad-band dielectric characterization of inhomogeneous materials such as these metamaterials. It operates from 85 MHz to 800 MHz, which is ideal for the UHF/VHF antenna design in this effort.

Figure 59:
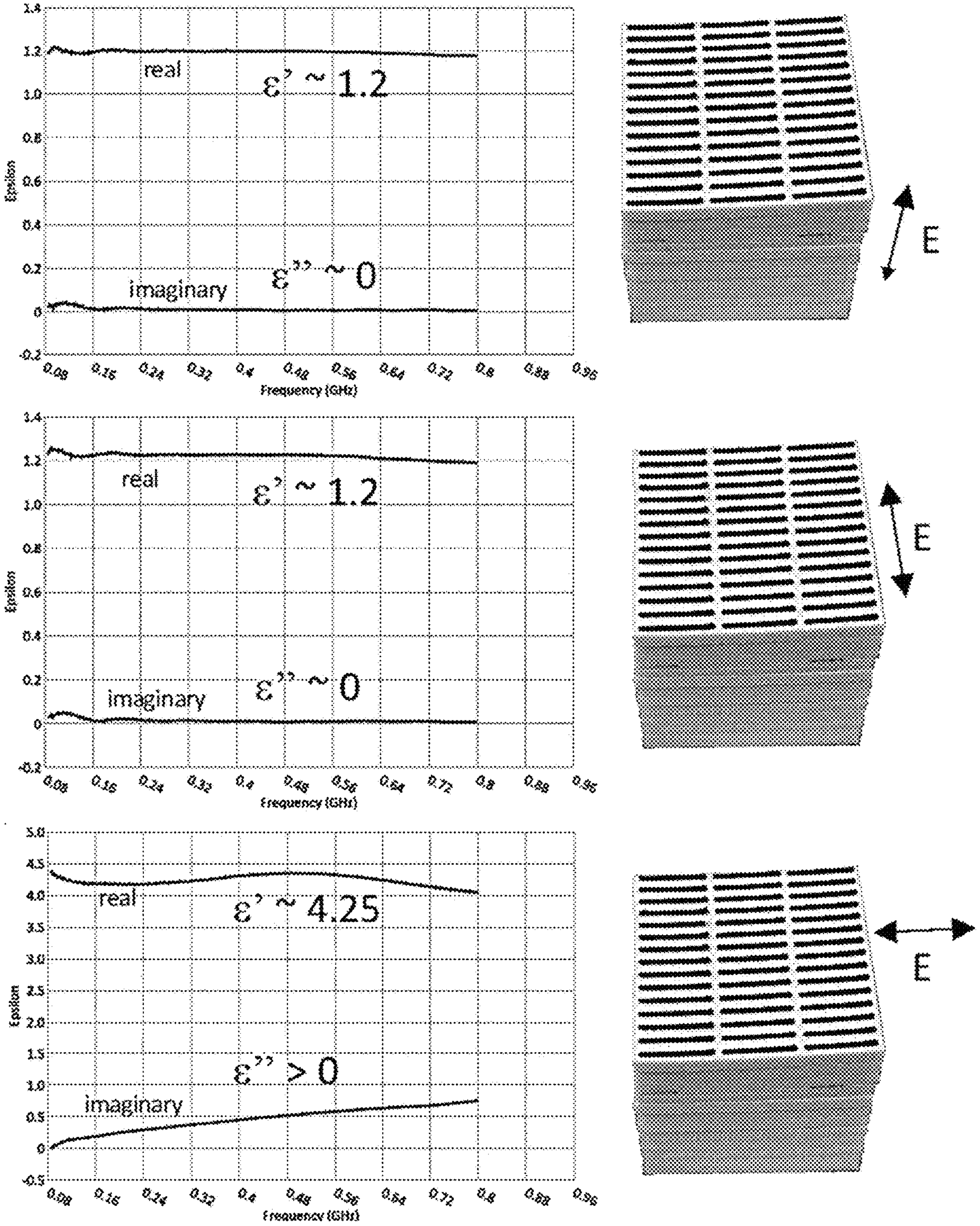

The RF properties of a sample, anisotropic dielectric are shown in FIG. 59. This sample was created using carbon-loaded filament, with moderate but not high conductivity, and thus the dielectric properties are not low loss.

Figure 60:
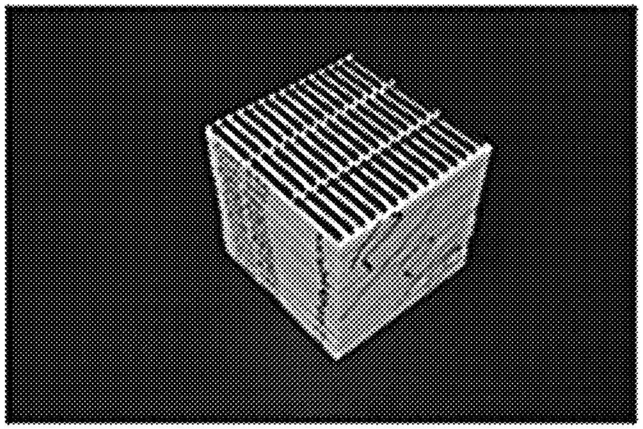
FIG. 60 illustrates an example of the measured characteristics of a low loss, anisotropic dielectric sample, in accordance with various embodiments of the present disclosure.

Switching to a higher conductivity carbon-fiber filled filament yielded anisotropic dielectric properties with low loss as shown in FIG. 60.

Manufacturing "Low-Loss" Anisotropic Meta-Materials

Figure 65:
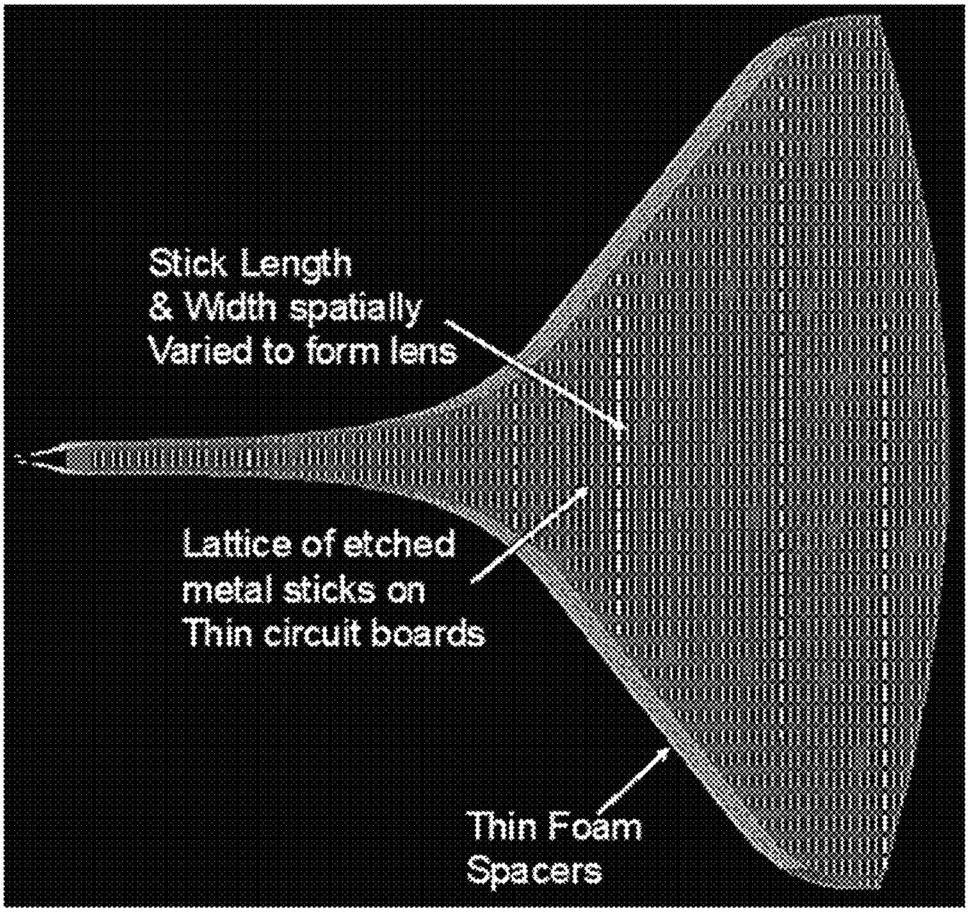
FIG. 65 illustrates an example of an antenna lens formed from etched metal sticks on a thin PCT separated by foam sheets, in accordance with various embodiments of the present disclosure.

In another embodiment, the low loss anisotropic metamaterial used to form the antenna lens can be formed by etching a lattice of thin metal sticks on printed circuit boards. These printed circuit boards are separated with low density foam sheets to form the antenna lens. The size and shape of these metal sticks are adjusted to form the desired spatially graded dielectric constant, as shown in FIG. 65.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An antenna, comprising:

electrically thin ($W \ll \lambda_{high}$), highly conducting, TEM mode antenna arms fed at a first end by a balun, where the TEM mode antenna arms are embedded in a spatially varied anisotropic dielectric material, and a separation between the TEM mode antenna arms increases from the first end to a second end where the TEM mode antenna arms transition to resistive card (Rcard) terminations when the TEM mode antenna arms are separated by a distance Hr, where a ratio of Hr to a height (H) of the antenna is in a range from about 0.2 to about 0.8.

2. The antenna of claim 1, wherein the balun is a chip balun.

3. The antenna of claim 1, wherein the balun is a geometric balun.

4. The antenna of claim 1, wherein the balun is an infinite balun.

5. The antenna of claim 1, wherein the spatially varied anisotropic dielectric material comprises an antenna throat region, an antenna transition region, an antenna lens region, an antenna back region and a balun region.

6. The antenna of claim 5, wherein the balun region comprises a printed circuit board.

7. The antenna of claim 5, wherein the antenna throat region comprises a machined unfilled polymer.

8. The antenna of claim 1, wherein the spatially varied anisotropic dielectric material inside the TEM mode antenna arms forms an elliptical lens profile.

9. The antenna of claim 1, wherein the spatially varied anisotropic dielectric material inside the TEM mode antenna arms forms a parabolic lens profile.

10. The antenna of claim 1, wherein the spatially varied anisotropic dielectric material inside the TEM mode antenna arms forms a hyperbolic lens profile.

11. The antenna of claim 1, wherein the spatially varied anisotropic dielectric material inside the TEM mode antenna arms forms a graded dielectric lens.

12. The antenna of claim 1, wherein the TEM mode antenna arms are terminated in a resistive card.

13. The antenna of claim 1, wherein a loss of the antenna back region is realized with a single resistive card.

14. The antenna of claim 1, wherein the spatially varied anisotropic dielectric material is formed using a lattice of conducting sticks in a low-density foam host.

15. The antenna of claim 14, wherein the lattice of conducting sticks in the low-density foam host is manufactured by milling one side of foam crackers and 3D printing a carbon fiber filament on the other side, the foam crackers coupled together by a snap fit connection.

16. The antenna of claim 1, wherein the ratio of Hr/H is in a range from about 0.4 to about 0.6.

17. The antenna of claim 1, wherein the spatially varied anisotropic dielectric material inside the TEM mode antenna arms is concentrated near an axis of the antenna and a remaining width is formed of low dielectric material.

18. The antenna of claim 1, wherein a separation between the TEM mode antenna arms follows an exponential function.

19. The antenna of claim 1, wherein an impedance of the TEM mode antenna arms follows an exponential function.

20. The antenna of claim 1, wherein the TEM mode antenna arms comprise a transition at an end, wherein the transition exponentially varies to flat at the end.

21. The antenna of claim 1, wherein the TEM mode antenna arms terminate into a resistive sheet at an end of the TEM mode antenna arms.

22. The antenna of claim 21, wherein the resistive sheet is curved to reduce end reflection.

23. The antenna of claim 1, wherein the spatially varied anisotropic dielectric material outside the TEM mode antenna arms comprises a lattice of lossy dielectric sticks.

24. The antenna of claim 1, wherein the spatially varied anisotropic dielectric material outside the TEM mode antenna arms comprises an on-axis resistive card.

25. The antenna of claim 1, wherein an end of the TEM mode antenna arms is tangent matched to a balun at the end of the TEM mode antenna arms.

26. The antenna of claim 1, wherein the spatially varied anisotropic dielectric material inside the TEM mode antenna comprises a lattice of conductive sticks of different sizes and shapes etched on thin printed circuit boards separated with foam sheets.

* * * * *